(12) United States Patent
Ishida et al.

(10) Patent No.: US 11,169,984 B2
(45) Date of Patent: Nov. 9, 2021

(54) DATA MANAGEMENT SYSTEM

(71) Applicant: Nomura Research Institute, Ltd., Tokyo (JP)

(72) Inventors: Yuzo Ishida, Tokyo (JP); Hironori Katsura, Tokyo (JP); Kojun Terai, Tokyo (JP); Kengo Yaji, Tokyo (JP); Nobuaki Kozuka, Tokyo (JP); Akio Saita, Tokyo (JP); Hiroshi Nakashima, Tokyo (JP); Kohei Goto, Tokyo (JP); Kotaro Ozawa, Tokyo (JP); Ryo Kamimura, Tokyo (JP)

(73) Assignee: NOMURA RESEARCH INSTITUTE, LTD., Tokyo (JP)

( * ) Notice: Subject to any disclaimer, the term of this patent is extended or adjusted under 35 U.S.C. 154(b) by 577 days.

(21) Appl. No.: 15/965,232

(22) Filed: Apr. 27, 2018

(65) Prior Publication Data

US 2018/0300688 A1   Oct. 18, 2018

Related U.S. Application Data

(63) Continuation of application No. PCT/JP2016/082855, filed on Nov. 4, 2016, and a
(Continued)

(51) Int. Cl.
  *G06F 16/23*    (2019.01)
  *G06F 16/11*    (2019.01)
(Continued)

(52) U.S. Cl.
  CPC ......... *G06F 16/2365* (2019.01); *G06F 16/11* (2019.01); *G06F 16/21* (2019.01); *G06F 16/24565* (2019.01); *G06Q 10/1053* (2013.01)

(58) Field of Classification Search
  CPC ............... G06Q 10/1053; G06F 16/21; G06F 16/24565; G06F 16/2365; G06F 16/11;
  (Continued)

(56) References Cited

U.S. PATENT DOCUMENTS

| | | | |
|---|---|---|---|
| 6,236,988 B1 * | 5/2001 | Aldred | G06F 16/289 |
| 7,107,283 B2 * | 9/2006 | Seifi | G06F 3/1211 |
| | | | 707/797 |

(Continued)

FOREIGN PATENT DOCUMENTS

| | | |
|---|---|---|
| JP | 2003-208346 | 7/2003 |
| JP | 2012-3572 | 1/2012 |

(Continued)

OTHER PUBLICATIONS

International Search Report dated Feb. 14, 2017 in corresponding International Patent Application No. PCT/JP2016/082855.
(Continued)

*Primary Examiner* — Scott A. Waldron

(57) ABSTRACT

A data management system including an AP server and a DB server. The AP server sends business data to the DB server and requests registration. The business data includes combination of parent data and a plurality of pieces of child data with mutual relevance, and each child data has ID of the parent data. In registering business data, the AP server first tries to register each child data, and requests registration of the parent data when a notification of registration completion of all pieces of the child data arrives from the DB server. When the notification of registration completion of any of the child data has not arrived, the AP server cancels the registration of the parent data. In referring to the business data, the AP server sets only child data with related parent data registered therein as a target.

8 Claims, 25 Drawing Sheets

Related U.S. Application Data continuation of application No. PCT/JP2015/081531, filed on Nov. 10, 2015, and a continuation of application No. PCT/JP2015/081327, filed on Nov. 6, 2015.

(51) Int. Cl.
*G06F 16/2455* (2019.01)
*G06F 16/21* (2019.01)
*G06Q 10/10* (2012.01)

(58) Field of Classification Search
CPC .. G06F 11/1474; G06F 12/00; G06F 2201/80; G06F 2201/835
See application file for complete search history.

(56) References Cited

U.S. PATENT DOCUMENTS

| | | | | |
|---|---|---|---|---|
| 2001/0010050 | A1* | 7/2001 | Sakata | G06F 16/958 715/255 |
| 2004/0199537 | A1* | 10/2004 | Duff | G06F 16/284 |
| 2009/0287719 | A1* | 11/2009 | Warner | G06F 16/86 |
| 2010/0082601 | A1* | 4/2010 | Ramesh | G06F 16/24553 707/714 |
| 2012/0105901 | A1* | 5/2012 | Miyazaki | G06Q 10/103 358/1.14 |
| 2012/0150791 | A1* | 6/2012 | Willson | G06F 16/254 707/600 |
| 2013/0013570 | A1* | 1/2013 | Yamakawa | G06F 3/0608 707/679 |
| 2014/0136573 | A1* | 5/2014 | Howard | G06F 16/284 707/803 |
| 2014/0229437 | A1* | 8/2014 | Takeuchi | G06F 16/275 707/624 |
| 2016/0004752 | A1* | 1/2016 | Zlamany | G06F 16/2228 707/725 |

FOREIGN PATENT DOCUMENTS

| | | |
|---|---|---|
| JP | 2013-131011 | 7/2013 |
| JP | 2013-164647 | 8/2013 |
| JP | 2013-242781 | 12/2013 |
| JP | 2014-41501 | 3/2014 |
| JP | 2015-165357 | 9/2015 |
| JP | 2016-35688 | 3/2016 |

OTHER PUBLICATIONS

International Search Report dated Jan. 12, 2016 in corresponding International Patent Application No. PCT/JP2015/081531.
International Search Report dated Feb. 9, 2016 in corresponding International Patent Application No. PCT/JP2015/081327.
International Search Report dated Jun. 14, 2016 for International Application No. PCT/JP2016/059241, 2 pages.
"What is movement?" Weblio dictionary, retrieved from www.weblio.jp/content%E7%A7%BB%E5%8B%95 on May 3, 2021; Wiktionary date May 2, 2020.
"What happens when you run the 4th 'Rollback'?"; retrieved from itpro.nikkeibp.co.jp/article/COLUMN/20071129/288388/; on May 3, 2021; dated Dec. 13, 2007.
Reference/Insertion/Updating/Deletion of SQL server; retrieved from www.server-world.info/query?os=Windows_Server_2012&p=sql2012&f=21 on May 3, 2021; dated Apr. 8, 2014.

* cited by examiner

[FIG. 2]
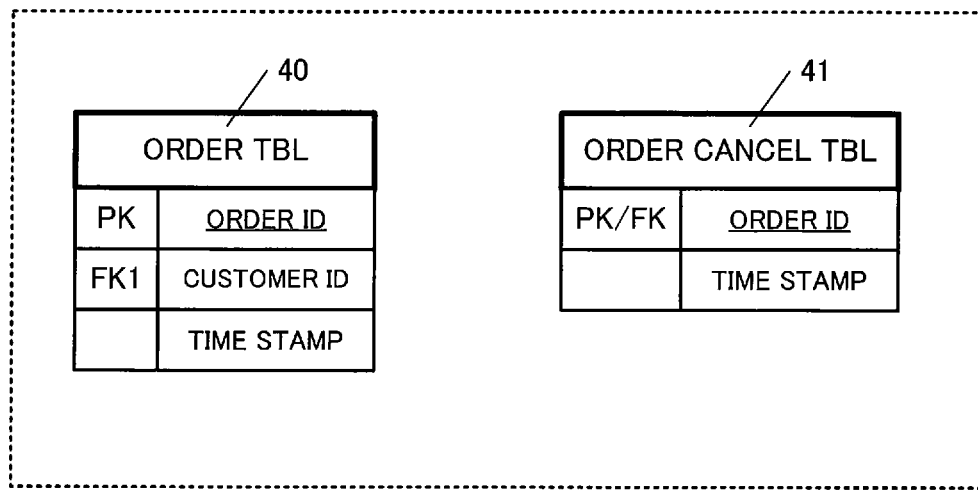
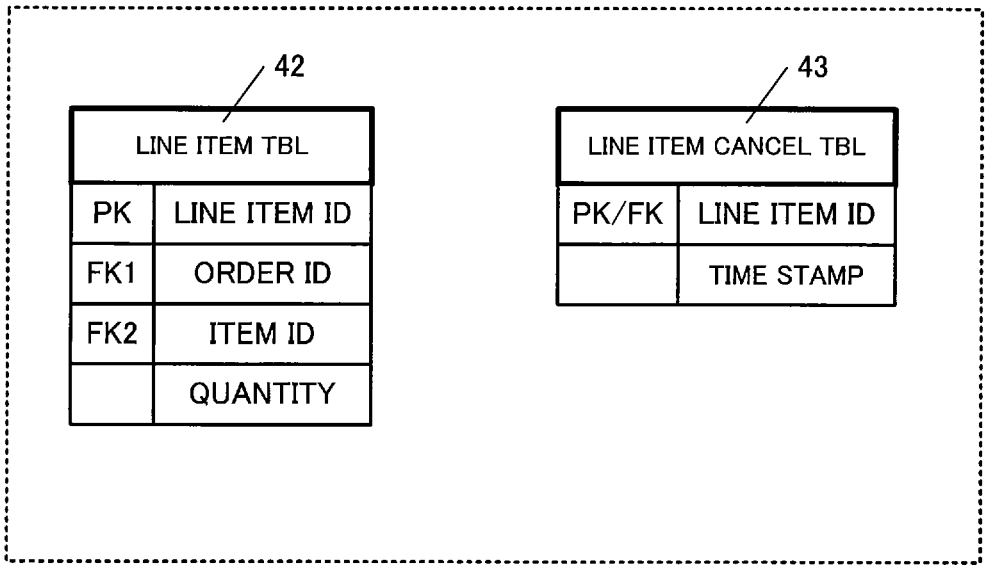

[FIG. 9]
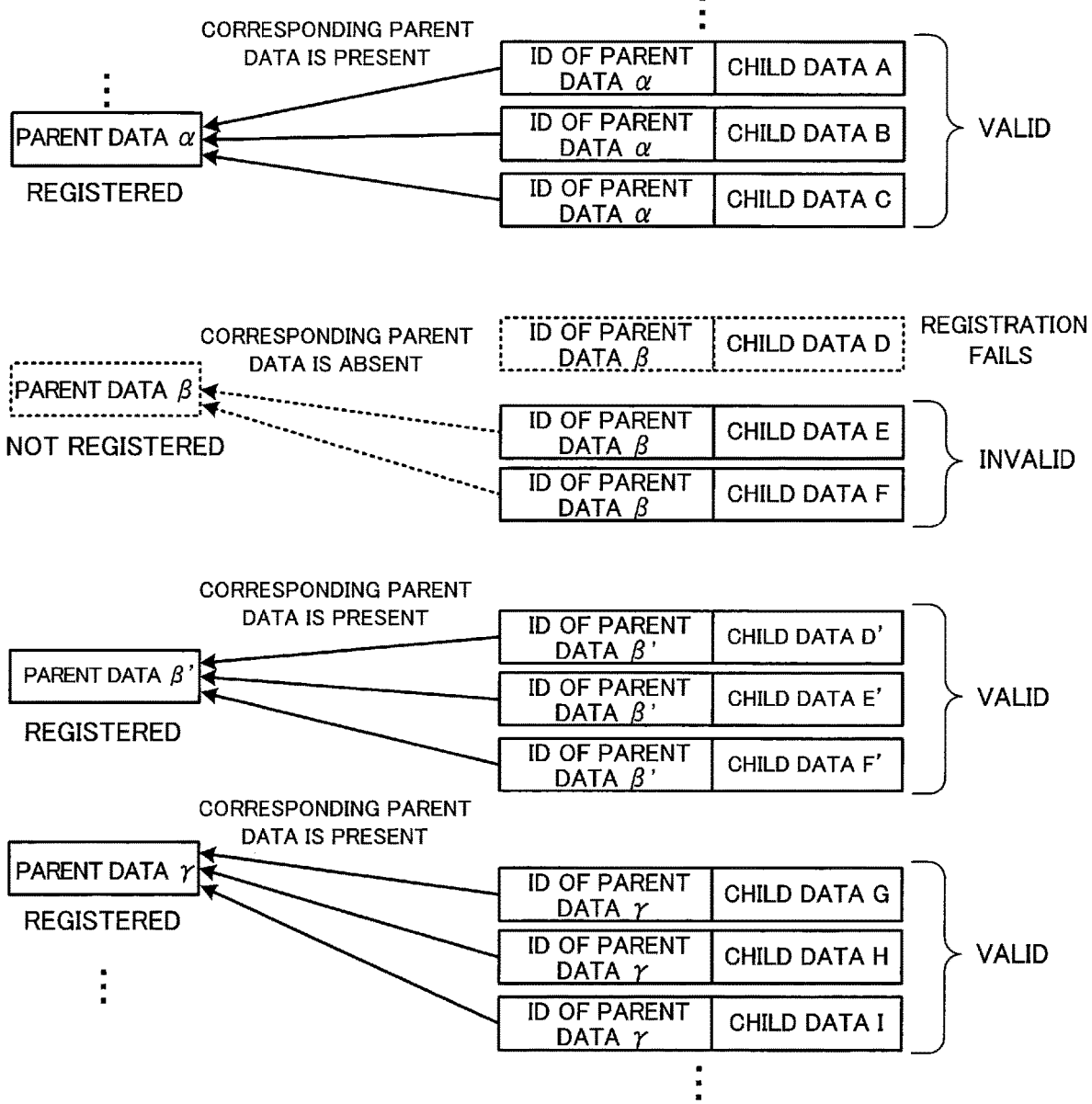

[FIG. 10]
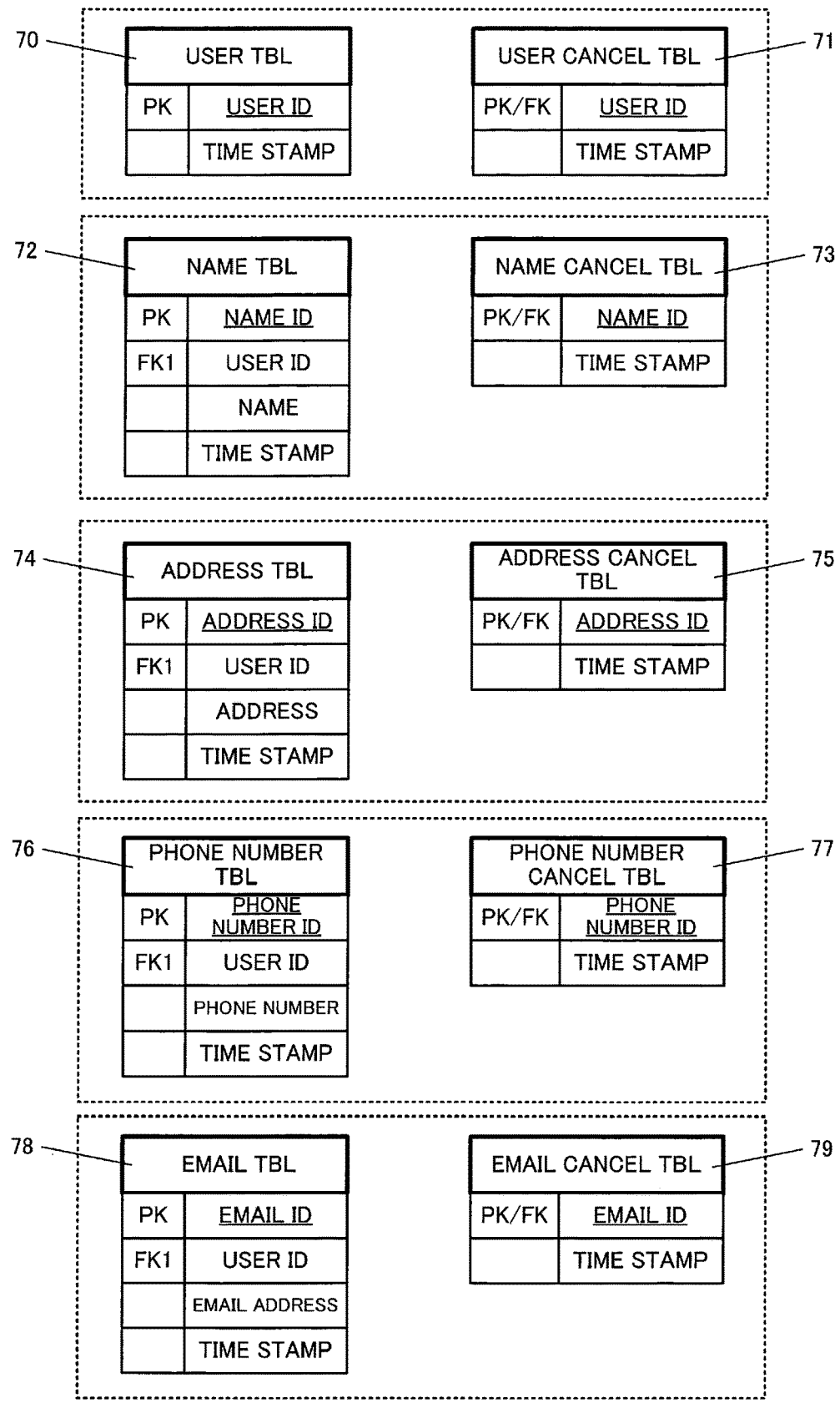

[FIG. 11]
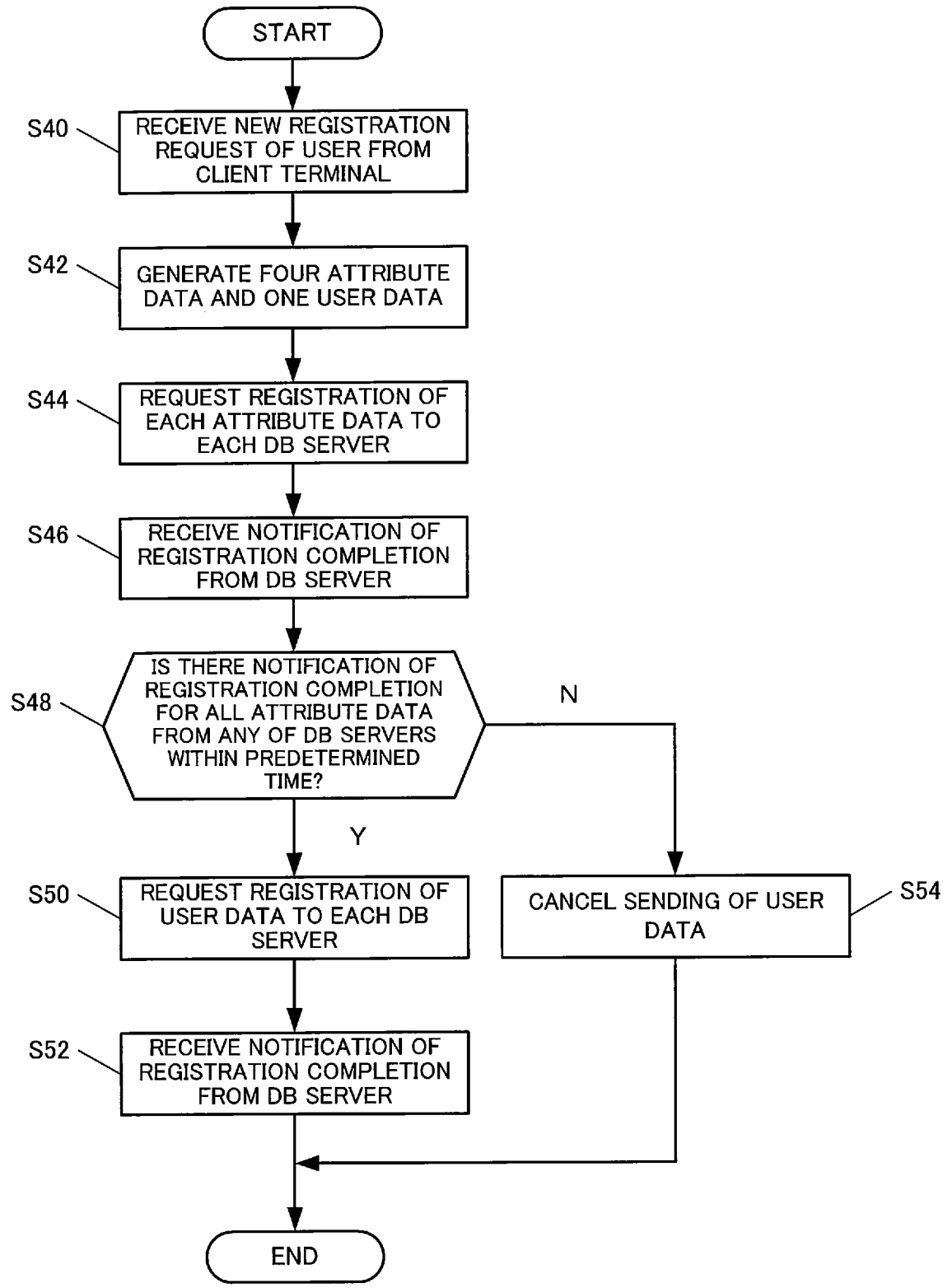

[FIG. 12]

| | | [NAME ID] | [USER ID] | [NAME] | [TIME STAMP] | |
|---|---|---|---|---|---|---|
| CHILD DATA | NAME DATA | ···000333329 | ···8888888889 | TARO YAMADA | 2015102216··· | 80 |

| | | [ADDRESS ID] | [USER ID] | [ADDRESS] | [TIME STAMP] | |
|---|---|---|---|---|---|---|
| | ADDRESS DATA | ···000444439 | ···8888888889 | TOKYO··· | 2015102216··· | 81 |

| | | [PHONE NUMBER ID] | [USER ID] | [PHONE NUMBER] | [TIME STAMP] | |
|---|---|---|---|---|---|---|
| | PHONE NUMBER DATA | ···000555559 | ···8888888889 | 03-3508··· | 2015102216··· | 82 |

| | | [EMAIL ID] | [USER ID] | [EMAIL ADDRESS] | [TIME STAMP] | |
|---|---|---|---|---|---|---|
| | EMAIL DATA | ···000666679 | ···8888888889 | t-yamada@··· | 2015102216··· | 83 |

REGISTER PARENT DATA AFTER REGISTERING OF ALL CHILD DATA

| | | [USER ID] | [TIME STAMP] | |
|---|---|---|---|---|
| PARENT DATA | USER DATA | ···8888888889 | 2015102216··· | 84 |

[FIG. 13]
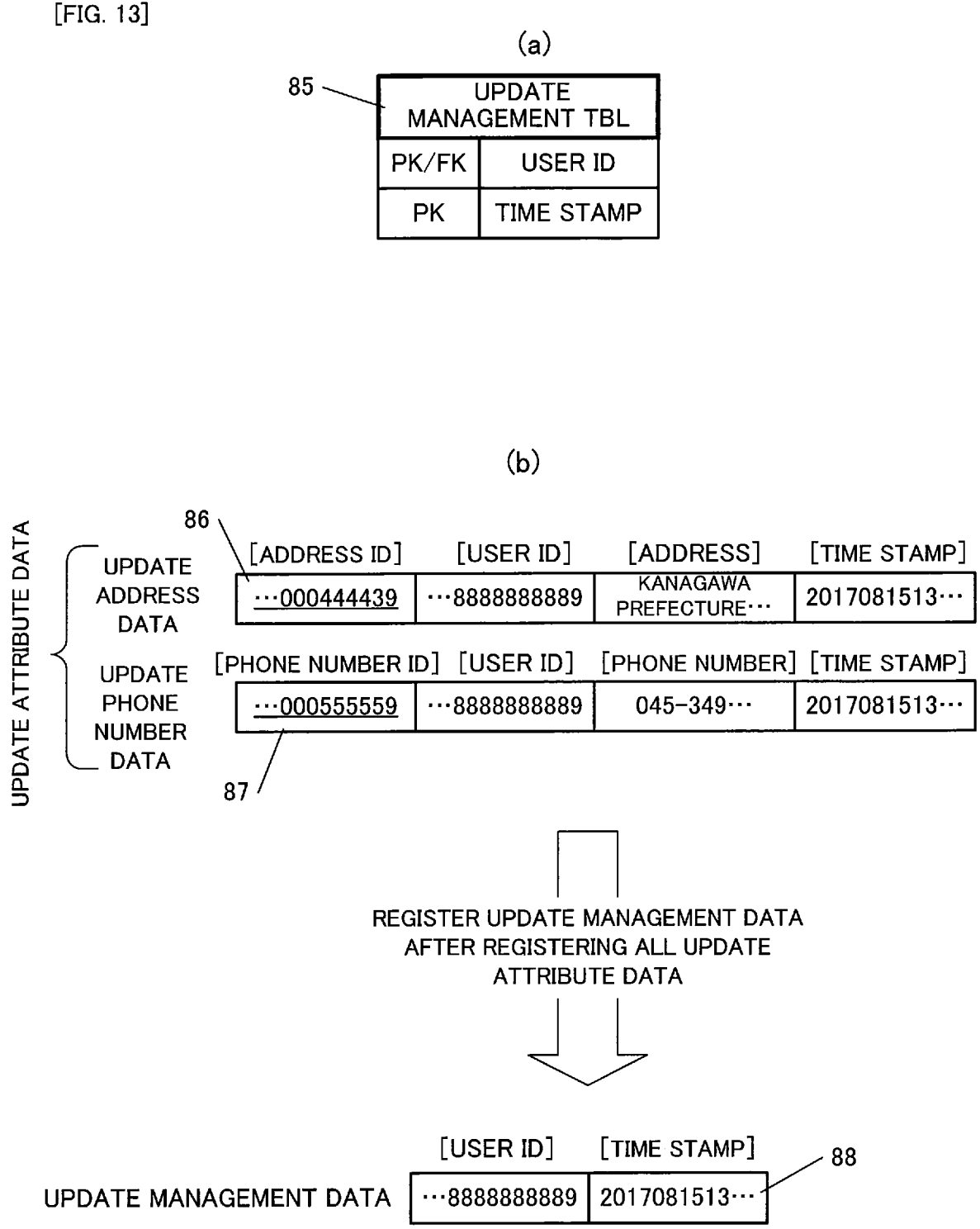

[FIG. 14]

PARENT DATA (ONE)

ORDER DATA

| ORDER ID | CUSTOMER ID | ORDER DATE AND TIME | TIME STAMP |
|---|---|---|---|
| ···1111111111 | 2834 | 2015102117··· | 2015102118··· |

CHILD DATA (THREE)

| | LINE ITEM ID | ORDER ID | ITEM ID | QUAN-TITY |
|---|---|---|---|---|
| LINE ITEM DATA (1) | ···0001234567 | ···1111111111 | 444444401 | 12 |
| LINE ITEM DATA (2) | ···0001234568 | ···1111111111 | 444444402 | 15 |
| LINE ITEM DATA (3) | ···0001234569 | ···1111111111 | 444444403 | 18 |

ONE TRANSACTION

[FIG. 16]
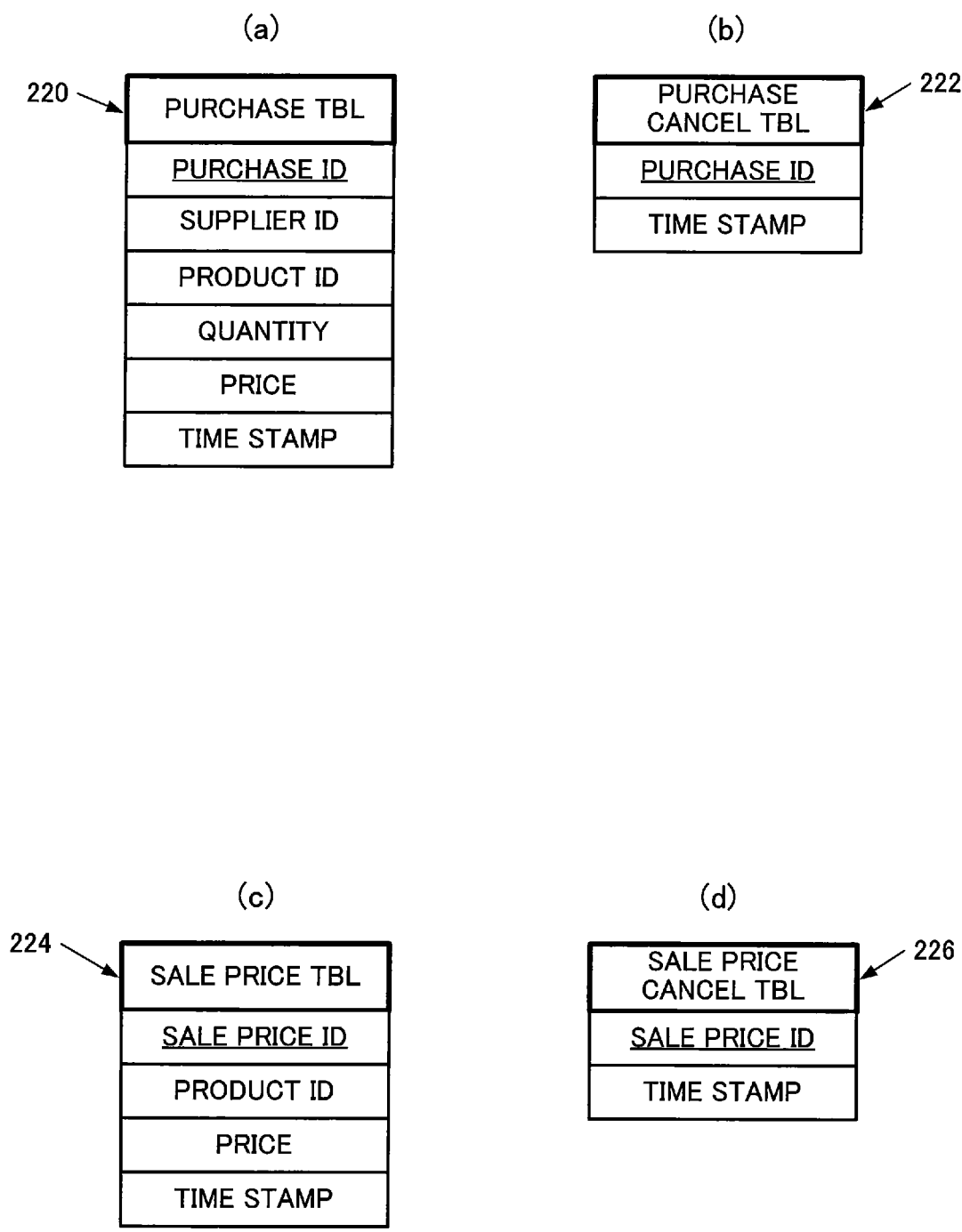

[FIG. 17]
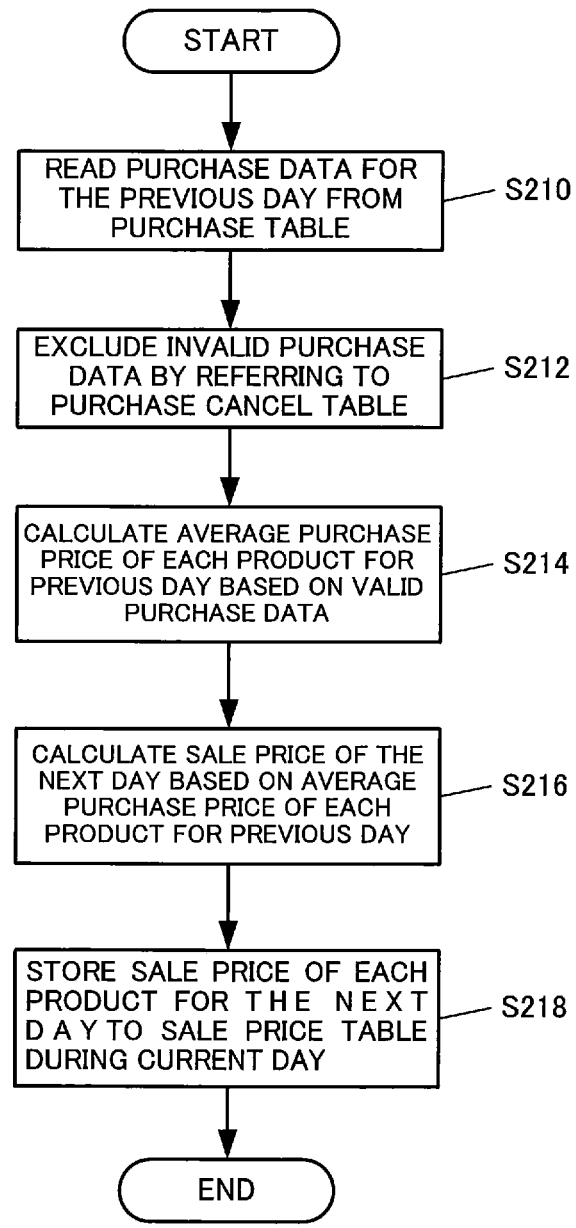

| PURCHASE ID | SUPPLIER ID | PRODUCT ID | QUAN-TITY | PRICE | TIME STAMP |
|---|---|---|---|---|---|
| ···123020 | FFFF | 11111 | 30 | 18000 | 2015/10/20/19:31··· |
| ···123021 | DDDD | 22222 | 10 | 6900 | 2015/10/20/19:52··· |
| ···123022 | GGGG | 55555 | 100 | 4500 | 2015/10/20/20:18··· |
| ⋮ | | | | | |
| ···123451 | AAAA | 55555 | 10 | 5000 | 2015/10/21/13:18··· |
| ···123452 | BBBB | 33333 | 12 | 9500 | 2015/10/21/14:51··· |
| ···123453 | CCCC | 22222 | 100 | 18700 | 2015/10/21/15:23··· |
| ⋮ | | | | | |
| ···123824 | FFFF | 55555 | 50 | 20000 | 2015/10/21/18:41··· |
| ···123825 | DDDD | 11111 | 15 | 9500 | 2015/10/21/19:35··· |
| ···123826 | EEEE | 22222 | 20 | 4000 | 2015/10/21/20:14··· |
| ⋮ | | | | | |
| ···124537 | GGGG | 55555 | 80 | 3800 | 2015/10/21/23:12··· |
| ···124538 | DDDD | 44444 | 30 | 18000 | 2015/10/22/00:09··· |
| ···124539 | HHHH | 55555 | 25 | 9500 | 2015/10/22/00:14··· |
| ⋮ | | | | | |

PURCHASE DATA FOR THE PREVIOUS DAY (21ST OCTOBER)

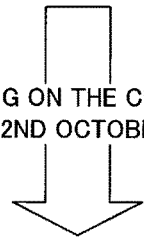

PROCESSING ON THE CURRENT DAY (22ND OCTOBER)

(b)

| SALE PRICE ID | PRODUCT ID | PRICE | TIME STAMP |
|---|---|---|---|
| ···543211 | 11111 | 700 | 2015/10/22/08:18··· |
| ···543212 | 22222 | 500 | 2015/10/22/08:21··· |
| ···543213 | 33333 | 950 | 2015/10/22/08:35··· |
| ···543214 | 44444 | 1000 | 2015/10/22/09:04··· |
| ···543215 | 55555 | 680 | 2015/10/22/09:16··· |
| ⋮ | | | |

APPLIED SALE PRICE DATA FOR THE NEXT DAY (23RD OCTOBER)

[FIG. 19]
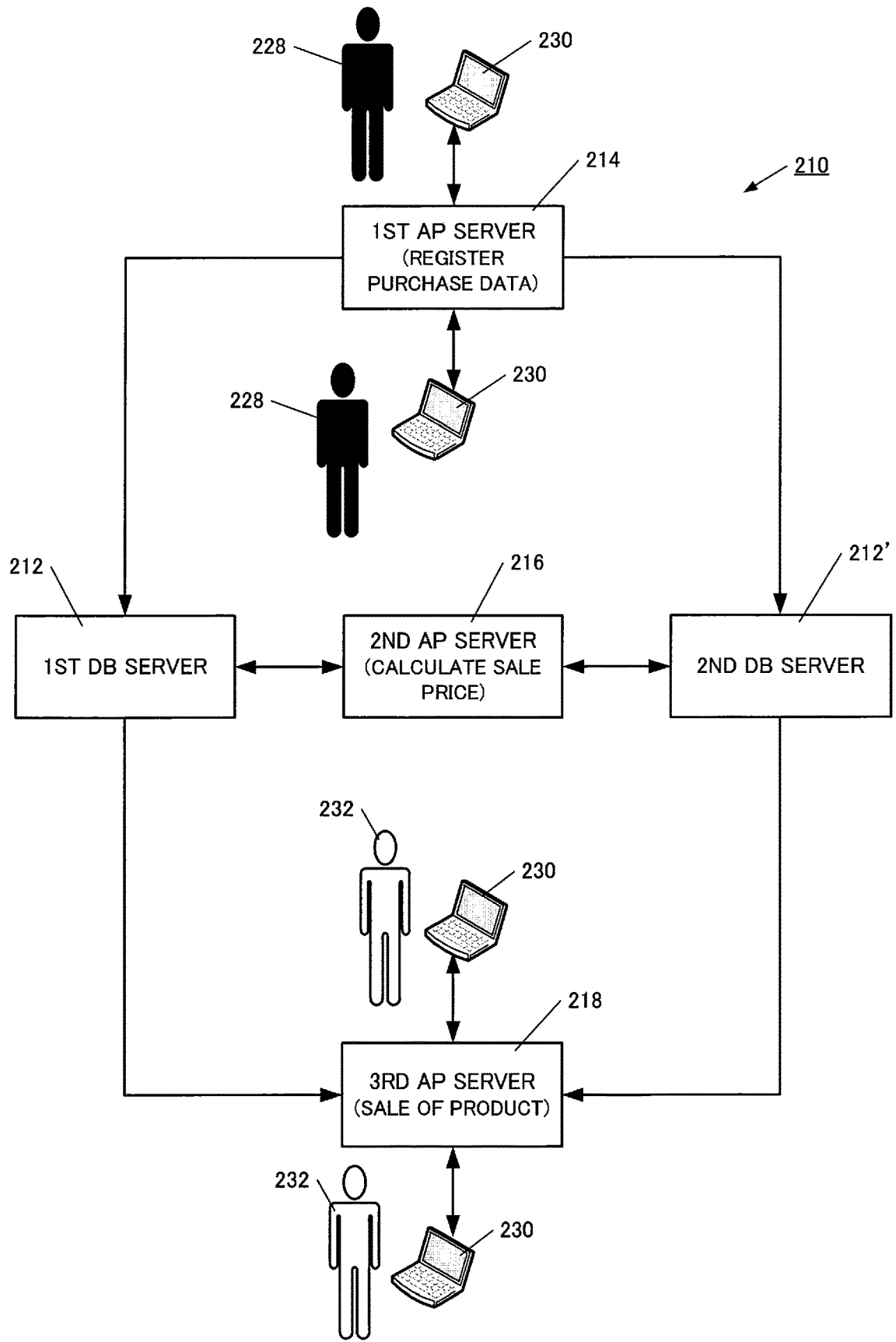

[FIG. 21]
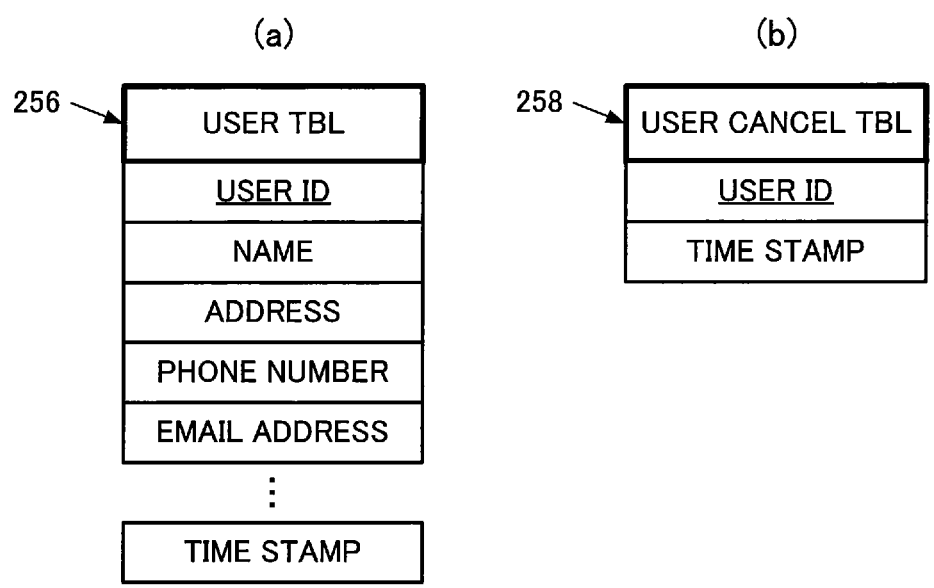

| | USER ID | NAME | ADDRESS | PHONE NUMBER | ... | TIME STAMP |
|---|---|---|---|---|---|---|
| X | 00012345 | TARO YAMADA | ...KOTO WARD, TOKYO | 03-5606... | ... | 2015/10/20/12:19... |
| Y | 00012346 | HANAKO SAITO | ...MATSUDO CITY, CHIBA | 047-302... | ... | 2015/10/20/15:31... |
| Z | 00012347 | KYOKO WADA | ...HAMAMATSU CITY, SHIZUOKA | 053-401... | ... | 2015/10/20/18:53... |

⋮

| | | | | | | |
|---|---|---|---|---|---|---|
| Y' | 00012346 | HANAKO UNNO | ...MATSUDO CITY, CHIBA | 047-302... | ... | 2016/08/13/15:33... |

⋮

| | | | | | | |
|---|---|---|---|---|---|---|
| X' | 00012345 | TARO YAMADA | ...MITAKA CITY, TOKYO | 0422-45... | ... | 2017/02/19/11:03... |

⋮

(b)

| | USER ID | TIME STAMP | |
|---|---|---|---|
| A | 00012345 | 2017/04/25/14:43... | → INVALIDATION OF X AND X' |

⋮

| | | | |
|---|---|---|---|
| B | 00012346 | 2017/05/28/16:08... | → INVALIDATION OF Y AND Y' |

⋮

| | | | |
|---|---|---|---|
| C | 00012347 | 2017/12/19/13:21... | → INVALIDATION OF Z |

⋮

[FIG. 23]
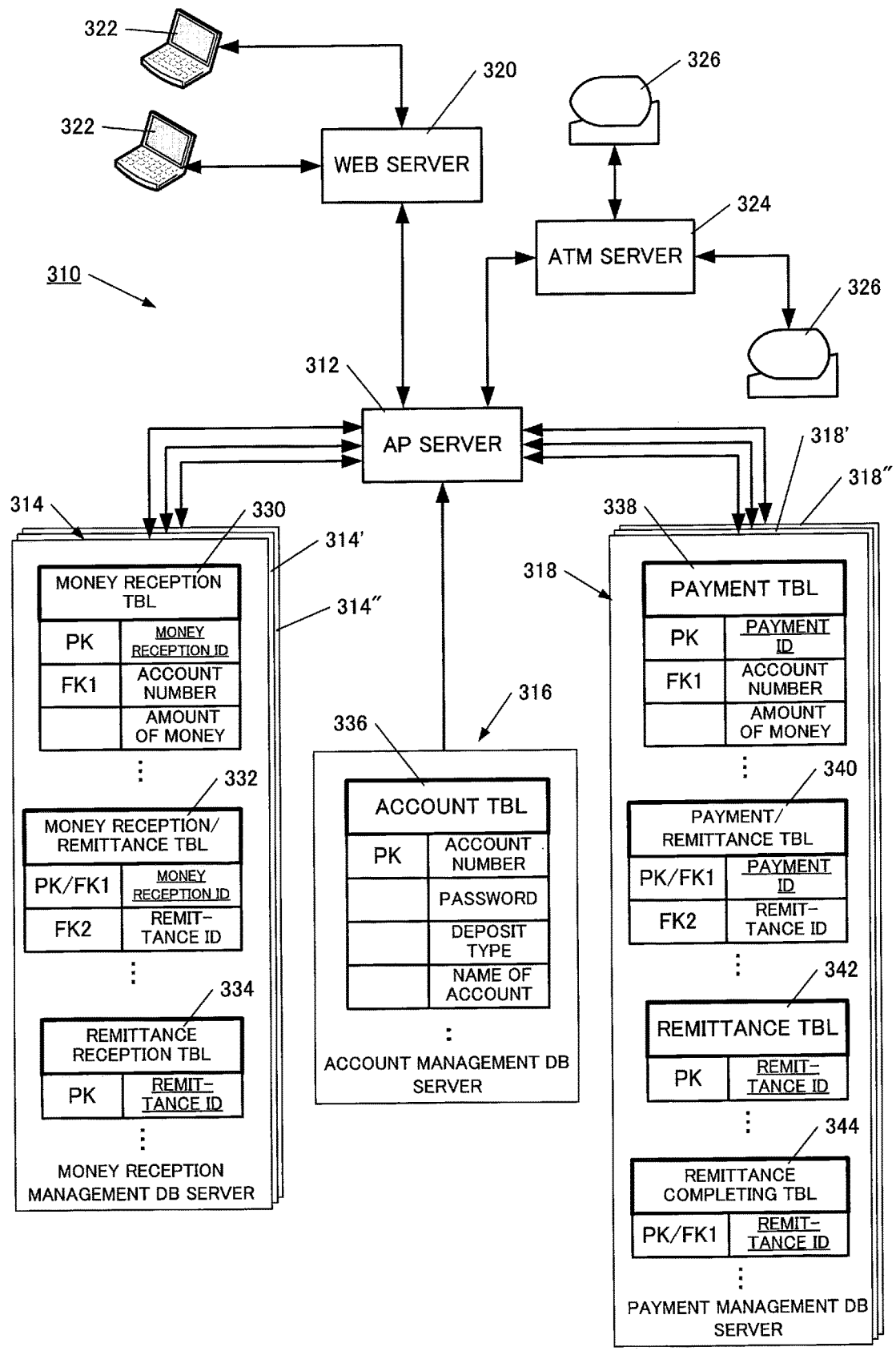

[FIG. 24]
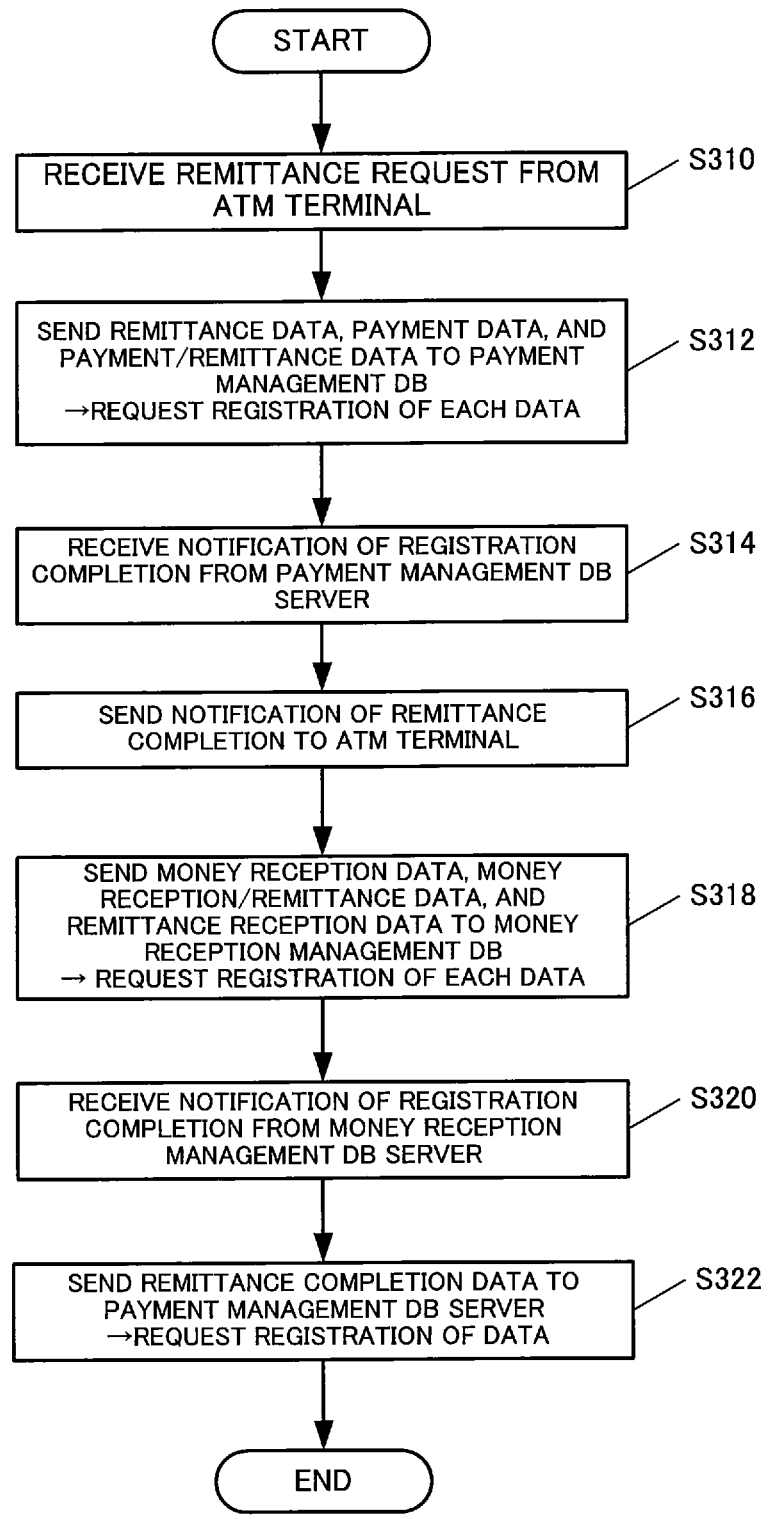

[FIG. 25]
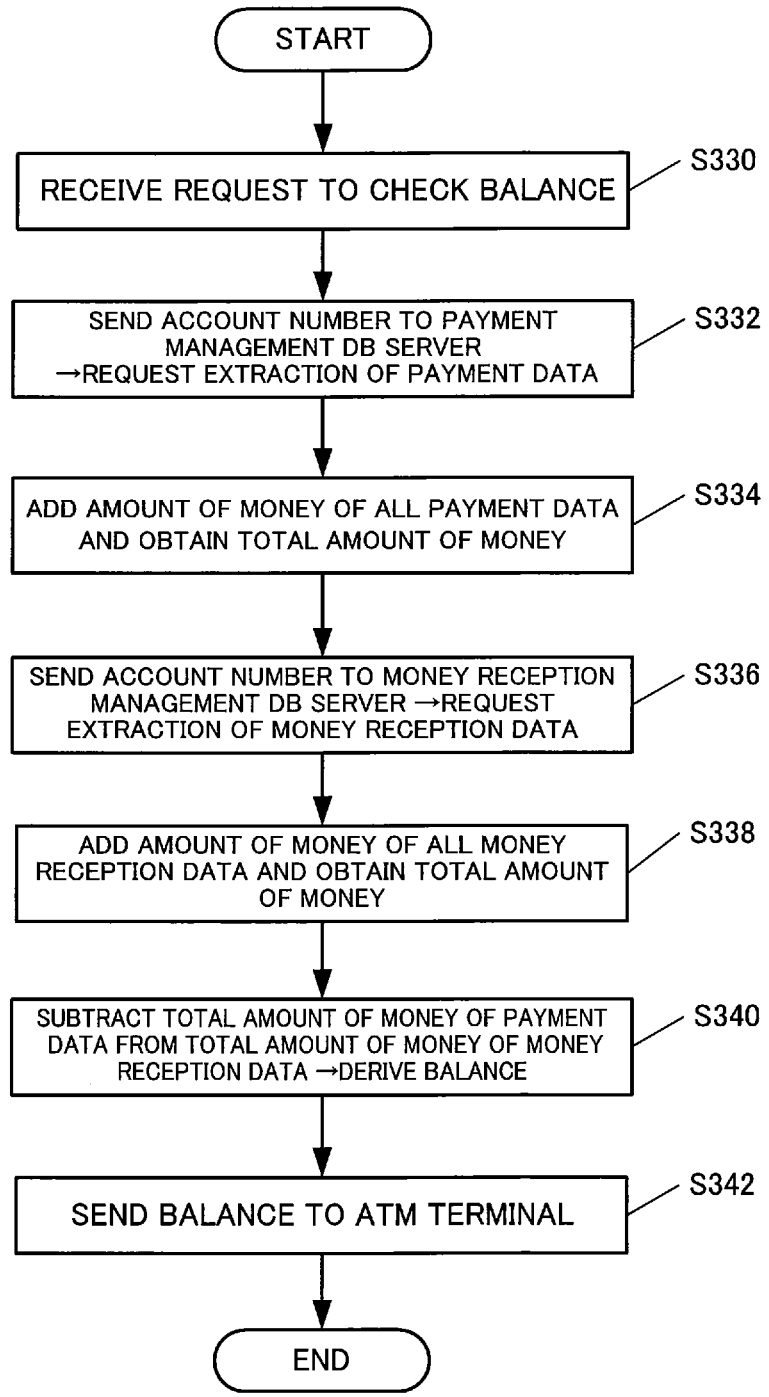

DATA MANAGEMENT SYSTEM

CROSS-REFERENCE TO RELATED APPLICATIONS

This application is a continuation application filed under 35 U.S.C. § 111(a) of PCT International Patent Application No. PCT/JP2016/082855, filed Nov. 4, 2016, which claims the priority benefit of International Patent Application No. PCT/JP2015/081327, filed Nov. 6, 2015 and International Patent Application No. PCT/JP2015/081531 filed Nov. 10, 2015, the contents of which are incorporated herein by reference.

FIELD

The invention relates to a data management system, in particular, relates to a technology for storing various business data generated by an AP server to a DB server and managing the data.

DESCRIPTION OF RELATED ART

[1] It is widely performed that various business data generated by an AP server are stored to a table provided in a DB server and the data is referred to if necessary. However, in registration of a plurality of pieces of data with constant relevance, if only a part of the data is registered and the remaining data is not registered due to some cause, an illegal state is caused when data is used. Therefore, the DB server executes transaction processing (refer to Non Patent Literature 1).

For example, on an online shopping site, as shown in FIG. 14, an AP server that has received order about three kinds of products from a user generates one order data with data items such as order ID, customer ID, and order date and time, and generates line item data (1), line item data (2), and line item data (3) each having data items such as line item ID, order ID, item ID, and quantity for respective products, thereafter sends each data to a DB server, and requests registration to a corresponding table.

Note that, each line item data commonly has 'order ID' of order data and is bundled as one with the order ID. Therefore, it is possible to make the order data function as 'parent data', and the line item data function as 'child data'.

The DB server to which the registration of the four pieces of data has been requested sequentially registers the order data to an order table, and the line item data (1), the line item data (2), and the line item data (3) to an line item table. At time of completing all registrations, the DB server sends a message of transaction completion to the AP server. On the side of the AP server, at time of receiving the message of transaction completion, each data is set as a reading target.

On the other hand, in a data registration process by the DB server, in the case of failing to register any of the line item data due to some reason, the DB server cancels the registration of the data whose registration has been completed and sends a message about a failure of the registration to the AP server.

The AP server having received the message sends the order data, the line item data (1), the line item data (2), and the line item data (3) again to the DB server, and performs again the registration processing of the data from the beginning.

As mentioned above, a plurality of pieces of data with mutual relevance is collected as one transaction, and roll-back processing for cancelling registration of the data is executed as long as the registration of all pieces of data is not completed. Thereby, dirty read for reading incomplete data with a damaged part ceases to be performed and reading consistency of data can be assured.

However, such transaction processing is provided as a function on the DB server side, and therefore, it has been necessary to send all pieces of the data included in one transaction to a common DB server.

Therefore, there is a problem that a request for load distribution using a plurality of DB servers cannot be handled.

Moreover, in order to realize the roll-back processing, complicated processing is forced to provide a structure for reliably leaving an updating log on the DB server side and to recover the state to the original state using the updating log, which causes increase in the load of the DB server (refer to Non Patent Literature 2).

Further, it is necessary on the AP server side to wait until a notification of registration completion arrives from the DB server, which leads to results that are contrary to improvement of processing efficiency.

[2] Further, the DB server executes processing of registration, updating, deletion, and extraction of business data in response to an SQL statement issued from the AP server (refer to Non Patent Literature 3). However, if, as mentioned above, the updating and deletion of the business data are executed via the DB server, there arises a problem that it is not possible to handle the case where it becomes necessary to refer to data before the updating or before the deletion later.

For example, regarding management of a human-affairs related master file, in a system in which a name of an employee whose family name has been changed so far due to marriage or the like is overwritten and updated, when a requirement of referring to a previous family name on the way is added, it is not easy to recover the lost data of the previous family name.

Moreover, in the case of handling a retired employee by deleting the data, there is a similar problem when it becomes necessary to refer to data of a retired employee later.

Obviously, it is preferable to make preparations, for example, to provide a data item for recording the change of a family name in employee attribute data from the beginning, and to set a retirement flag to a data item 'retirement' in the case of retirement. However, perfect prediction of future necessity is difficult in data design and also leads to redundancy of a data structure, and therefore it is not the realistic countermeasure.

[3] Furthermore, in a system for executing batch processing at a regular interval based on data stored in the DB server, it is necessary to definitely separate data that fall within a target period of the batch processing from data that fall outside the target period. Therefore, there arises a problem of a complicated system structure and a cumbersome operation sequence.

Non Patent Literature 1:
Transaction processing
Internet URL:
http://www.weblio.jp/content/%E7%A7%BB%E5%8B%95
Search Date: 20 Oct. 2015
Non Patent Literature 2:
What will be done when 'ROLLBACK' is executed?
Internet URL:
http://itpro.nikkeibp.co.jp/article/COLUMN/20071129/
288388/Search
Date: 20 Oct. 2015

Non Patent Literature 3:
Reference/Insertion/Updating/Deletion of SQL server
Internet URL:
http://www.server-world.info/query?os=Windows Server 2012&p=sq12012&f=21
Search Date: 4 Nov. 2015

SUMMARY

The invention is devised in consideration of such a current situation, and has a first object to realize a data management technology of dispensing with roll-back processing even when failing to register a part of data in registering a plurality of pieces of related data to a DB server.

Further, it is a second object to realize a data management technology capable of flexibly handling a case where reference to past data becomes necessary on the way of operation of a system.

Furthermore, it is a third object to realize a data management technology of enabling execution of batch processing in parallel with accumulation of data without separating target data of the batch processing from data not included in the target.

In order to accomplish the above objects, a data management system according to claim 1 is a data management system including an AP server and a DB server, wherein the AP server has a function of sending business data generated as a result of business processing to the DB server and requesting registration to a corresponding table, the business data includes combination of parent data and a plurality of pieces of child data which have mutual relevance, each of the pieces of child data includes ID of the parent data as an external key in addition to ID unique to the child data, upon registration of the business data, the AP server first requests registration of each child data to the DB server, and requests registration of the parent data to the DB server when a notification of registration completion relating to all pieces of the child data arrives from the DB server, or cancels the registration of the parent data when the notification of registration completion of any of the child data does not arrive within a predetermined time, and upon reference to the registered business data, the AP server sets only child data with relevant parent data registered therein as a reference target, and does not set child data with relevant parent data not registered therein as a reference target.

The data management system according to claim 2 is the system of claim 1, further includes a plurality of DB servers, and upon registration of the parent data, the AP server requests registration to a DB server separate from the DB server that has requested the registration of the child data.

The data management system according to claim 3 is the system of claim 1, further includes a plurality of DB servers each including a common table that stores identical data, and upon registration of the business data, the AP server first requests registration of each child data to each of the DB servers, and requests registration of the parent data to each of the DB servers when a notification of registration completion of all pieces of the child data arrives from any of the DB servers, or cancels the registration of the parent data when the notification of registration completion of any of the child data does not arrive from any of the DB servers within a predetermined time.

A data management system according to claim 4 is the system of claim 3, further a limitation is set to permit only reference and addition of a record and prohibit deletion and updating, to a table of the DB server.

A data management system according to claim 5 is the system of claim 4, further, when existing business data needs to be deleted, the AP server generates data for data cancel having a data item for setting ID of business data to be a cancel target, and allows the data for data cancel to be added and registered to a table dedicated for cancel which is provided in each DB server, thereby substantially invalidating the existing business data.

A data management system according to claim 6 is the system of claim 4 or 5, further a time stamp at business processing time is marked in each of the business data, and the AP server, when the existing business data needs to be updated, newly generates business data for updating having ID identical to ID of the business data and including a value after correction and a time stamp at correction time, and additionally registers the business data for updating to a corresponding table provided in each of the DB servers, thereby substantially updating the existing business data.

A data management system according to claim 7 is the system of claim 6, further, the AP server, when it is necessary to simultaneously update a plurality of pieces of existing child data with mutual relevance, newly generates child data for updating including ID unique to each child data, ID of the parent data that is mutually common, a value after each correction, and a time stamp at correction time that is mutually common, and also generates updating management data including ID of the parent data and the time stamp, first requests registration of each child data for updating to each of the DB servers, requests registration of the updating management data to each of the DB servers when a notification of registration completion of all pieces of the child data for updating arrives from any of the DB servers, or cancels the registration of the updating management data when the notification of registration completion of any of the child data does not arrive from any of the DB servers within a predetermined time, and upon reference to the child data for updating, sets only child data for updating with registration of the updating management data having the ID of the parent data relating to each of the child data for updating and the time stamp as a reference target, and does not set child data for updating with the updating management data not registered therein as a reference target.

A data management system according to claim. 8 is a system including an AP server and a DB server, a table of the DB server includes a limitation that only reference and addition of a record are permitted and deletion and updating are prohibited, and the AP server includes functions of: adding data generation time as a time stamp to business data generated as a result of business processing, sending the data to the DB server, and requesting registration to a corresponding table; generating, when it is necessary to delete existing business data, data for data cancel having a data item for setting ID of business data to be a cancel target, and adding and registering the data to a table dedicated for cancel which is provided in the DB server, thereby substantially invalidating the existing business data; newly generating, when it is necessary to update the existing business data, business data for updating having ID identical to ID of the business data and including a value after correction, and a time stamp at correction time, and adding and registering the business data for updating to a corresponding table provided in the DB server, thereby substantially updating the existing business data; and extracting, when it is necessary to refer to business data at a past specific time, corresponding business data based on time recorded in the time stamp of each business data stored in the table.

A data management system according to claim 9 is the system of claim 8, and further the AP server has a function of executing predetermined batch processing based on business data generated within a specific period among the business data stored in the table, and further identifies, in the batch processing, business data to be a target of the batch processing and business data not included in the target based on the time recorded in the time stamp of each business data stored in the table.

In a data management system according to claim 1, such a structure is provided that parent data is not registered as long as a DB server does not complete registration of all pieces of child data. At time of data reference, such a rule is applied that 'child data with corresponding parent data not registered therein is not included in a target.' is applied. Therefore, even in the case where registration of a part of the child data fails, the remaining child data successfully registered do not need to be deleted by roll-back processing.

Further, as a result of dispensing with the roll-back processing by the DB server, a conventional limitation that the same DB server has to be in charge of registration processing for a plurality of pieces of data included in one transaction is released.

In addition, in transaction processing assuming conventional roll-back, since, at time of registration completion of all pieces of data, a message (commitment) of successful transaction is issued from the DB server, it has been necessary to wait until the AP server side receives the message. On the other hand, since only a notification of registration completion of each data is received from the DB server in the case of this system and a message of transaction completion is not issued, an amount of data communication in the whole system can be reduced accordingly and a wait time of the AP server can be reduced.

With the data management system according to claim 2, the registrations of parent data and child data are processed by separate DB servers, and therefore it is possible to achieve load distribution of the whole system.

In the case of the data management system according to claim 3, if a notification of registration completion of each child data arrives from at least one of a plurality of DB servers operating in parallel, the system can shift to registration of parent data. Therefore, it is possible to achieve load distribution of the whole system and increase of processing speed.

In the case of the data management system according to claim 4, updating and deletion of a record to each DB server are prohibited, and therefore, in the case of occurrence of a trouble in any of the DB servers, it has an advantage of allowing simple recovery only by copying differential data from another DB server.

In this case also, it is possible to realize the substantial deletion and updating of business data by use of the structures according to claims 5 and 6.

Incidentally, in simultaneously updating values of a plurality of pieces of child data with mutual relevance by use of the structure according to claim 6, when the registration of a part of the child data fails, since the registration of parent data relating to the child data already exists, a rule for invalidation cannot be applied because of absence of the parent data.

On the other hand, with the structure according to claim 7, such illegal child data can be substantially invalidated because of absence of updating management data having the same time stamp and ID of the parent data.

In the case of the data management system according to claim 8, data generation time is marked to business data generated by an AP server as a time stamp, and the business data once generated will be semi-permanently stored to a table of the DB server without being deleted or updated. Therefore, it has an advantage capable of flexibly handling even the case where an unexpected request for data reference occurs later.

In the case of the data management system according to claim 9, even in the case where the AP server executes batch processing at a regular interval, target data of the batch processing and data not included in the target can be identified by reference to a time stamp of each business data. Therefore, it is possible to execute the batch processing in parallel with accumulation of data without separating the target data of the batch processing from the data not included in the target.

BRIEF DESCRIPTION OF DRAWINGS

FIG. 2 is a diagram showing an example of a table stored in each DB server.

FIG. 5 is a diagram showing a structure of an surrogate key management table or the like.

FIG. 9 is a schematic diagram showing a state of determining whether the child data is valid/invalid depending on the presence or absence of corresponding parent data.

FIG. 10 is a diagram showing another specific example of tables stored in each DB server.

FIG. 11 is a flowchart showing a processing sequence in the case where the system is applied to management operation of user attribute data.

FIG. 12 is a diagram showing specific examples of various attribute data (child data) and user data (parent data) of a user.

FIG. 13 is a diagram showing a specific example of an updating management table and specific examples of updating attribute data, and updating management data.

FIG. 14 is a diagram showing an example of configuration data of a general transaction.

FIG. 16 is a diagram showing examples of tables stored to the DB server.

FIG. 17 is a flowchart showing processing contents of a second AP server.

FIG. 18 is a data structure diagram showing processing contents of the second AP server.

FIG. 19 is a diagram showing an example of installing a plurality of DB servers.

FIG. 21 is a diagram showing an example of a table stored to the DB server.

FIG. 22 is a diagram showing a substantial updating method and a substantial deleting method of user data.

FIG. 23 is a schematic diagram showing the whole configuration of an account data management system.

FIG. 24 is a flowchart showing a sequence of remittance processing of the account data management system.

FIG. 25 is a flowchart showing a sequence of balance checking processing in the account data management system.

DESCRIPTION OF EMBODIMENTS

Figure 1:
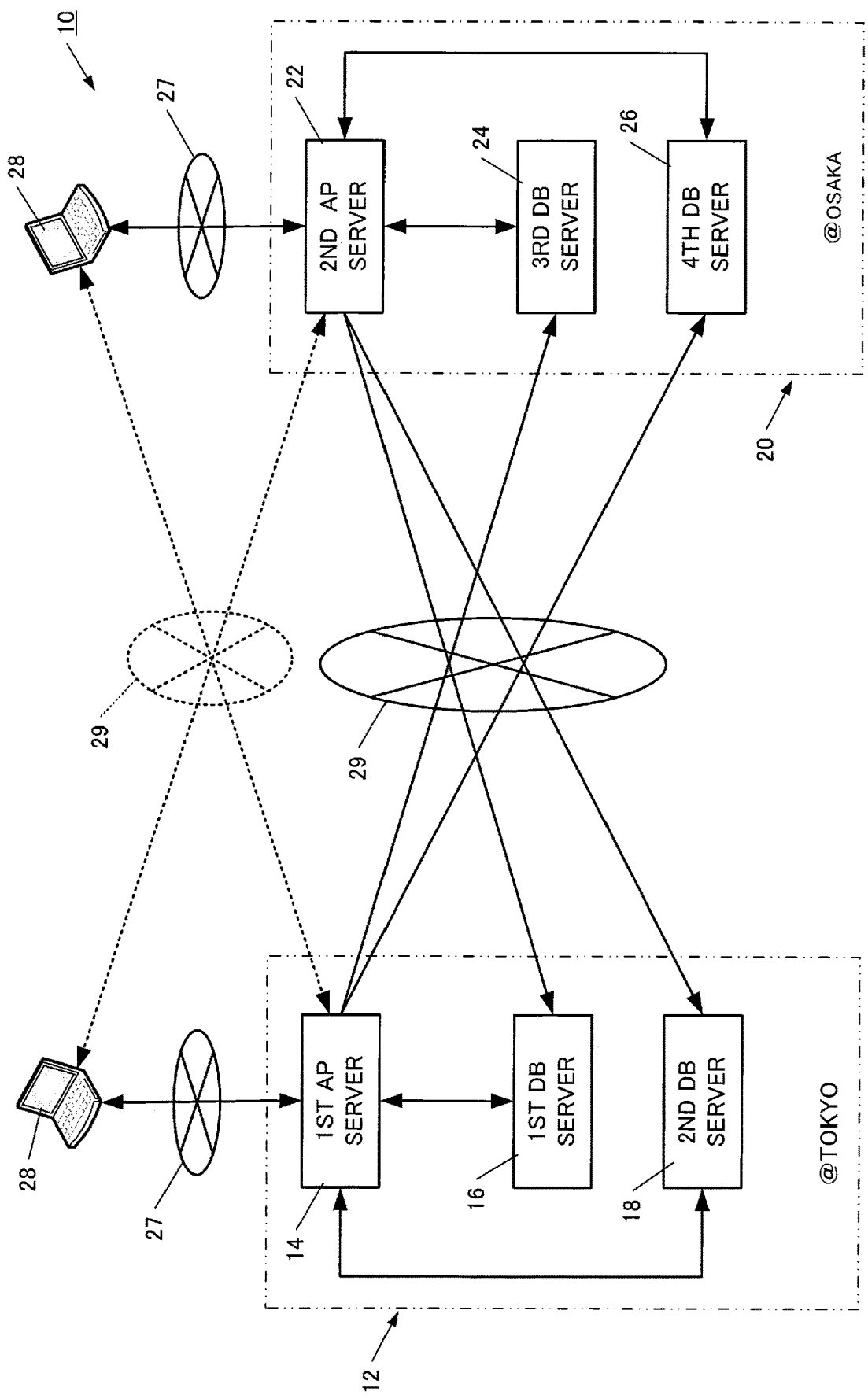
FIG. 1 is a diagram of the whole configuration of a data management system according to the invention.

FIG. 1 is a diagram of a whole configuration of a first data management system 10 according to the invention.

First, in a first data center 12 set up in Tokyo, a first AP server 14, a first DB server 16, and a second DB server 18 are installed.

Further, in a second data center 20 set up in Osaka, a second AP server 22, a third DB server 24, and a fourth DB server 26 are installed.

The AP server and the DB server arranged in the same data center do not need to be configured by physically independent machines (with independent IP addresses), respectively.

That is, they may be configured as a plurality of AP servers (AP nodes) and a plurality of DB servers (DB nodes), with deployment for designating a plurality of NUMA nodes (different Port numbers) on the same server (same IP address).

The first AP server 14 and the second AP server 22 have the same application program, respectively, and have a function of executing the same business processing in response to a request sent from a client terminal 28 via a communication network 27 such as the Internet.

For the sake of convenience in drawings, only the first AP server 14 and the second AP server 22 are drawn. However, a plurality of AP servers each having the same function is actually installed in each data center, thereby achieving load distribution via a load balancer (not shown).

As mentioned above, if a plurality of AP servers is provided in the same data center, at scheduled stop or also at unscheduled stop of any of the AP servers, the AP server can be substituted by the remaining AP server in the same data center without being switched to an AP server in another data center, and down time can be minimized.

The number of DB servers is not limited and three or more DB servers can be installed within each data center.

The first DB server 16, the second DB server 18, the third DB server 24, and the fourth DB server 26 include a common table, respectively, and each table stores the same data.

Here, as shown in FIG. 2, each DB server commonly includes an order table 40, an order cancel table 41, an line item table 42, and an line item cancel table 43.

Data items of order ID (primary key), customer ID (external key), and a time stamp are set to the order table 40.

Further, data items of order ID (primary key/external key) and a time stamp are set to the order cancel table 41.

Data items of line item ID (primary key), order ID (external key), item ID (external key), and quantity are set to the line item table 42.

Further, data items of line item ID (primary key/external key) and a time stamp are set to the line item cancel table 43.

Unique identification codes with an surrogate key are stored to the order ID and the line item ID (the details will be described later).

The first AP server 14 is connected to the first DB server 16 and the second DB server 18 via a LAN, and is also connected to the third DB server 24 and the fourth DB server 26 installed in the second data center 20 via a communication line 29.

Moreover, the second AP server 22 is connected to the third DB server 24 and the fourth DB server 26 via a LAN, and is also connected to the first DB server 16 and the second DB server 18 installed in the first data center 12 via the communication line 29.

At normal time, the client terminal 28 installed in the eastern Japan is connected to the first AP server 14 installed in the first data center 12, and the client terminal 28 installed in the western Japan is connected to the second AP server 22 installed in the second data center 20.

On the other hand, when a large-scale earthquake occurs in the capital region, for example, and the first data center 12 is seriously damaged, the connection destination of the client terminal 28 installed to the eastern Japan is switched to the second AP server 22 installed in the second data center 20 with setting change of a DNS server (not shown). Therefore, the continuousness of services to users in the eastern Japan can be secured.

Similarly, when the second data center 20 is damaged, the connection destination of the client terminal 28 installed in the western Japan is switched to the first AP server 14 installed in the first data center 12.

As mentioned above, each data center provides services to a near client terminal 28 at normal time. On the other hand, services are provided to the client terminals 28 throughout Japan at disaster time. Therefore, as mentioned above, each DB server needs to mutually keep data with the same contents as usual.

Further, since a plurality of DB servers each having the same data is installed also in the same data center, the AP server can request an arbitrary DB server to extract data when referring to the data, and the load distribution can be achieved.

The number of data centers is not limited to two. It is preferably configured such that a larger number of data centers are provided to each region as much as possible, a plurality of AP servers with the same function is installed, respectively, and the AP servers are connected to all DB servers installed in each data center via a communication network.

Figure 3:
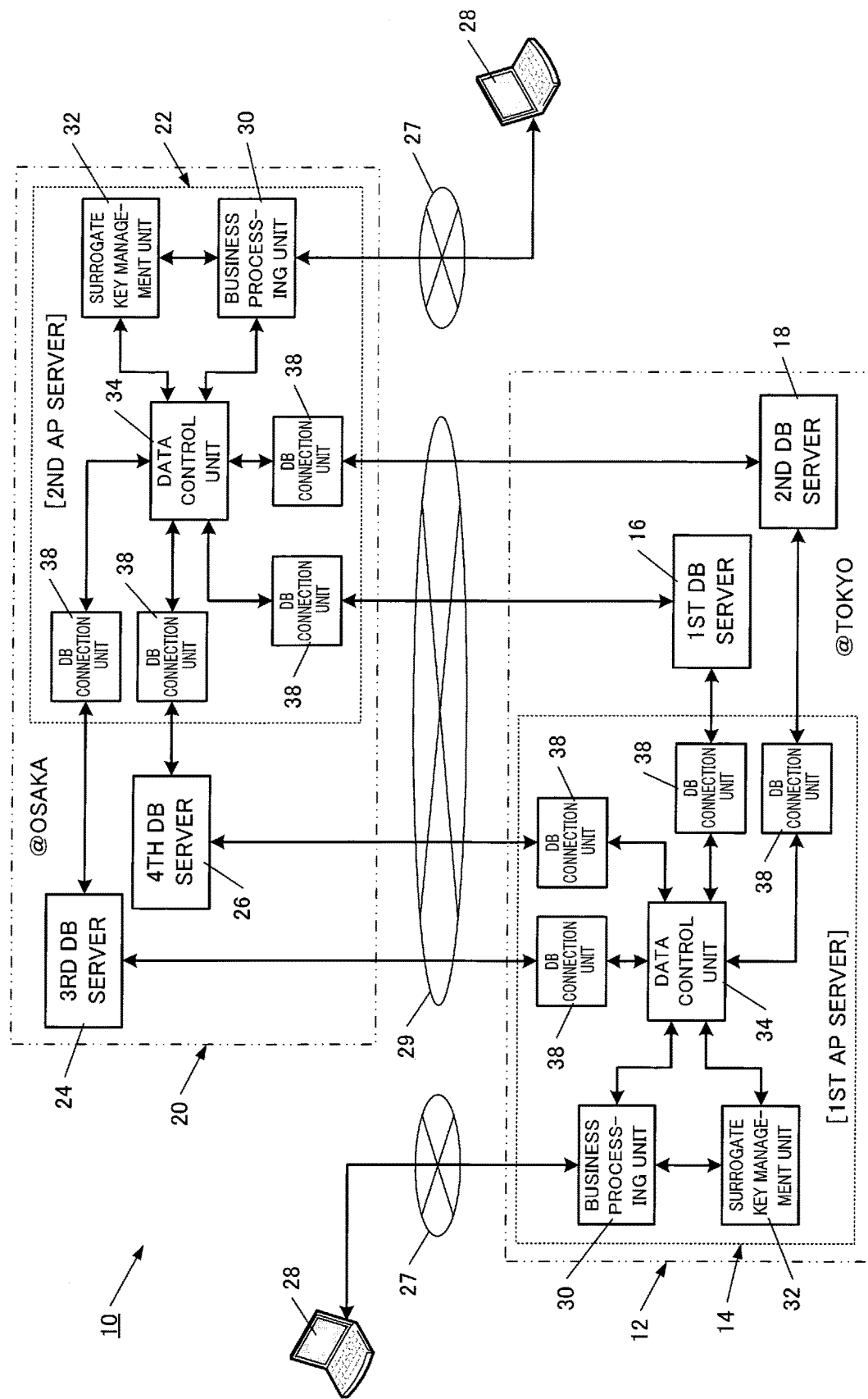
FIG. 3 is a block diagram showing internal configurations of a first AP server and a second AP server.

FIG. 3 shows internal configurations of the first AP server 14 and the second AP server 22, each includes a business processing unit 30, an surrogate key management unit 32, a data control unit 34, and a plurality of DB connection units 38.

The business processing unit 30 executes generating processing and calculating processing of data in response to a request from the client terminal 28, registering processing to the DB server, and the like. A CPU of the AP server operates in accordance with a dedicated application program, thereby realizing the business processing unit 30.

The surrogate key management unit 32 has a function of issuing an surrogate key (surrogate key) in response to a request from the business processing unit 30 (details will be described later).

The CPU of the AP server operates in accordance with a dedicated middleware, thereby realizing the surrogate key management unit 32.

The data control unit 34 has a function of copying data the number of times of copying corresponding to the number of DB servers when having received an instruction for data registration from the business processing unit 30, and sending the pieces of copied data to the DB connection units 38, respectively. A CPU of the AP server operates in accordance with a dedicated middleware, thereby realizing the data control unit 34.

Further, the data control unit 34 also has a function of instructing updating of surrogate key management data to the DB connection unit 38 in charge of each DB server installed in the same data center in response to an instruction of the surrogate key management unit 32 (details will be described later).

Each DB connection unit 38 achieves a function of, for example, issuing an SQL statement to the DB server that is assigned in advance to the DB connection unit 38 and instructing additional registration and reference of data. A CPU of the AP server operates in accordance with a dedicated middleware, thereby realizing the DB connection unit 38.

Figure 4:
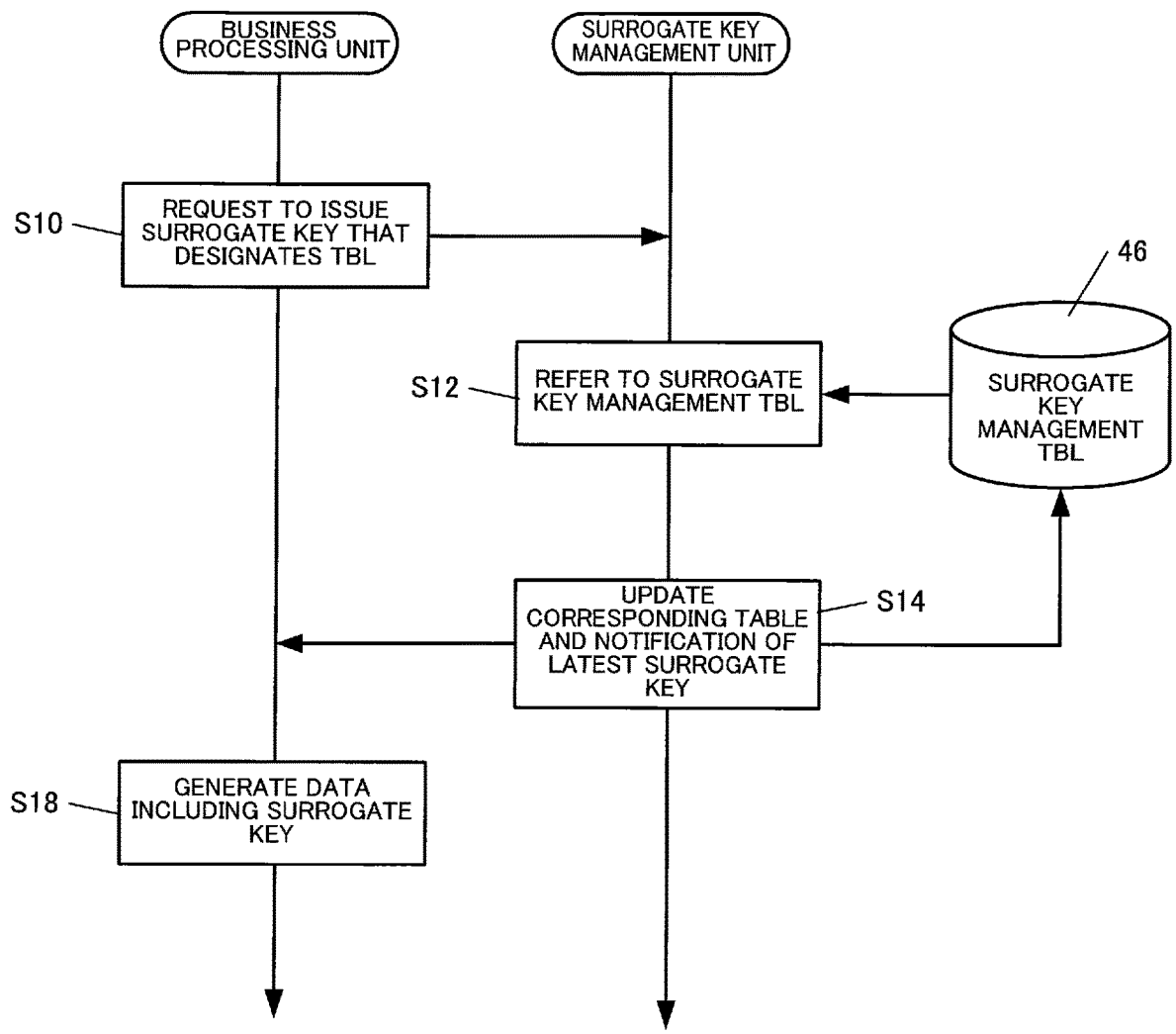
FIG. 4 is a flowchart showing an issuing sequence of an surrogate key.

Here, a description will be given of a structure for giving an surrogate key in the system 10 based on a flowchart in FIG. 4.

First, the business processing unit 30 in which data needs to be generated as a result of business processing requests the surrogate key management unit 32 to designate a table and issue an surrogate key (S10). In a case of generating data stored in the order table 40, it requests to issue an surrogate key for 'order ID'.

The surrogate key management unit 32 having received the request refers to an surrogate key management table 46 stored in the DB server installed in the same data center (S12).

Figure 5:
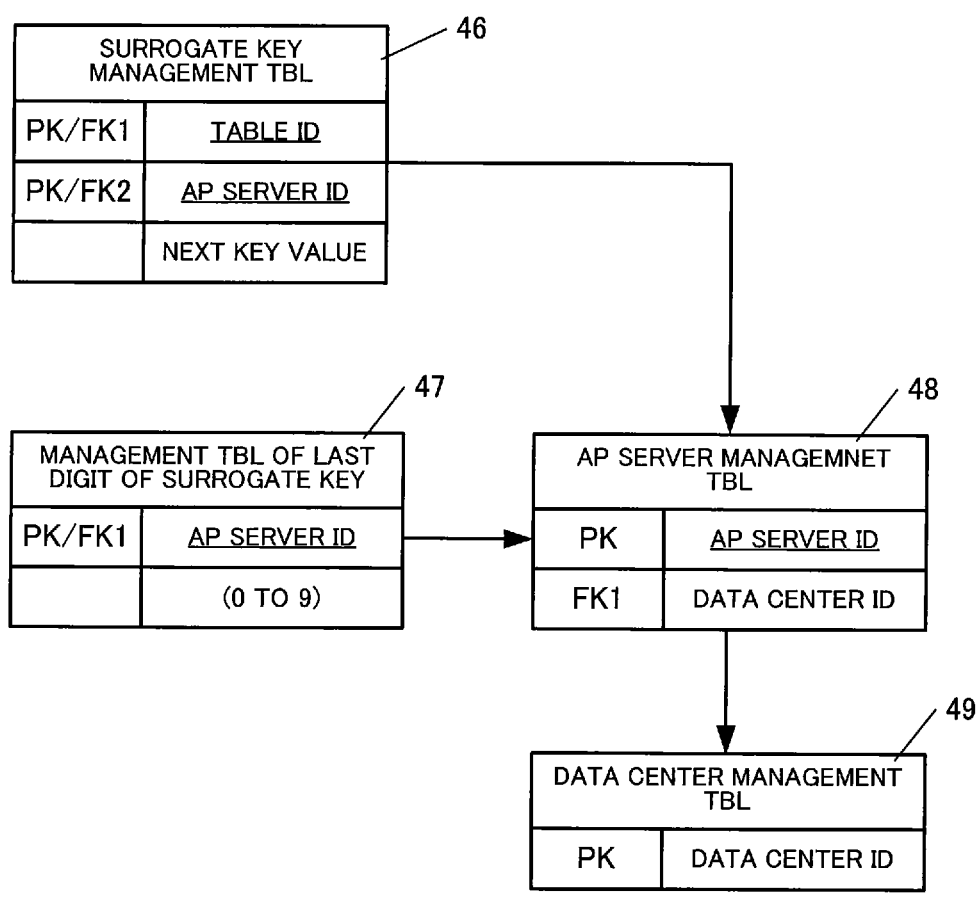

As shown in FIG. 5, the surrogate key management table 46 has data items of 'table ID', 'AP server ID', and 'next key value', and manages the latest surrogate key (next key value) in a unit of 'table ID'+'AP server'.

Here, the 'surrogate key' includes a numerical value having a predetermined length (e.g., 32-bit or 64-bit).

Moreover, an identification code (any of numerical numbers 0 to 9) for specifying the AP server that has generated the data is set to the last digit (end) of the numerical value.

Specifically, in a last-digit management table 47 of the surrogate keys, a relevance between IDs of the respective AP servers and numerical values 0 to 9 is defined.

Moreover, in an AP server management table 48 and a data center management table 49, a relevance between the respective AP servers and the data centers is defined.

The last-digit management table 47 of these surrogate keys, the AP server management table 48, and the data center management table 49 are also stored into the DB server in the same data center, similarly to the surrogate key management table 46.

The surrogate key management unit 32 updates a value of the 'next key value' related to the order table 40, and sends a notification of the latest surrogate key (value before updating) to the business processing unit 30 (S14).

In the updating, the surrogate key management unit 32 sets a 'value obtained by adding one to a numerical value having a part excluding the identification code at the last digit in the previous value (the latest value described above)' to the 'next key value' in the order table 40 related to the corresponding AP server.

However, an updating method of the latest value of the surrogate key is not limited to such 'ascending order', and may be 'descending order' for setting a 'value obtained by subtracting one from a numerical value having a part excluding the identification code at the last digit in the previous value (the latest value described above)'. The identification code of the AP server is also not limited to numerical values '0 to 9' as described above, and however, may use other kinds of characters. Further, the identification code may be inserted to the head of the surrogate key.

Furthermore, only a numerical value excluding the identification code of the AP server is stored to the 'next key value' of the surrogate key management table 46, and the surrogate key management unit 32 can, at the issuing time of the surrogate key, also add a corresponding identification code to the last digit of the numerical value, or the like, and issue the result to the business processing unit 30.

The business processing unit 30 having received the latest surrogate key from the surrogate key management unit 32 generates data obtained by setting the surrogate key as ID to a primary key or an external key (S18).

The data is sent to all the DB servers via the data control unit 34 and the DB connection units 38, and additionally registered to corresponding tables (order table 40 and line item table 42, etc.) provided in each of the DB servers.

As mentioned above, the uniqueness is assured in the surrogate key in a unit of 'AP server×table', and each AP server is linked to a specific data center in the data center management table 49. Therefore, even if the surrogate key is uniquely issued in each AP server, the uniqueness is secured to the numerical value of the last digit. Since there is no risk of issuing an overlapped surrogate key, the uniqueness of each data is reliably assured.

Note that, a request for issuing an surrogate key issued from the business processing unit 30 of the AP server is stored to a que once and is then processed under a rule of FIFO (first-in, first-out). Therefore, there is no risk of erroneously issuing an surrogate key with a small value to the data generated later, the order is assured.

The data generated by the business processing unit 30 in each AP server is stored in the table in each DB server as mentioned above. However, a limitation for prohibiting the deletion (delete) and prohibiting the updating (update) is provided in advance to each table.

Briefly, in the system 10, only addition (insert) and reference (select) are permitted to each table.

Therefore, in a case where the existing data needs to be invalidated, an equal state is realized by adding a new record to another table, in place of deleting the record.

For example, in order to invalidate specific order data stored in the order table 40 shown in FIG. 2, order cancel data is added to the order cancel table 41 in FIG. 2.

The order ID of the order data to be a cancel target is filled in the primary key of the order cancel data. Therefore, the business processing unit 30 ignores the order data whose order ID is registered to the order cancel table 41 as not included in the target among the order data registered to the order table 40.

Similarly, in a case of invalidating the line item data, the line item cancel data is added to the line item cancel table 43.

Since the line item ID of the line item data to be a cancel target is filled in the primary key of the line item cancel data, the business processing unit 30 ignores the line item data whose line item ID is registered to the line item cancel table 43, as not included in the target among the line item data registered to the line item table 42.

Further, in a case where the registered data needs to be corrected in the system 10, the case is handled by newly registering a record including data after the correction, in place of updating the existing record.

For example, in a case of correcting the 'quantity' of certain line item data, the line item data obtained by changing only the quantity with the same line item ID, order ID, and item ID is added to the line item table 42.

Note that, even if data before the correction and data after the correction have the same line item ID, it is possible for the business processing unit 30 to specify the latest data at counting time without fails, because time at data generation is recorded to the time stamp with precision of millisecond in each data.

Figure 6:
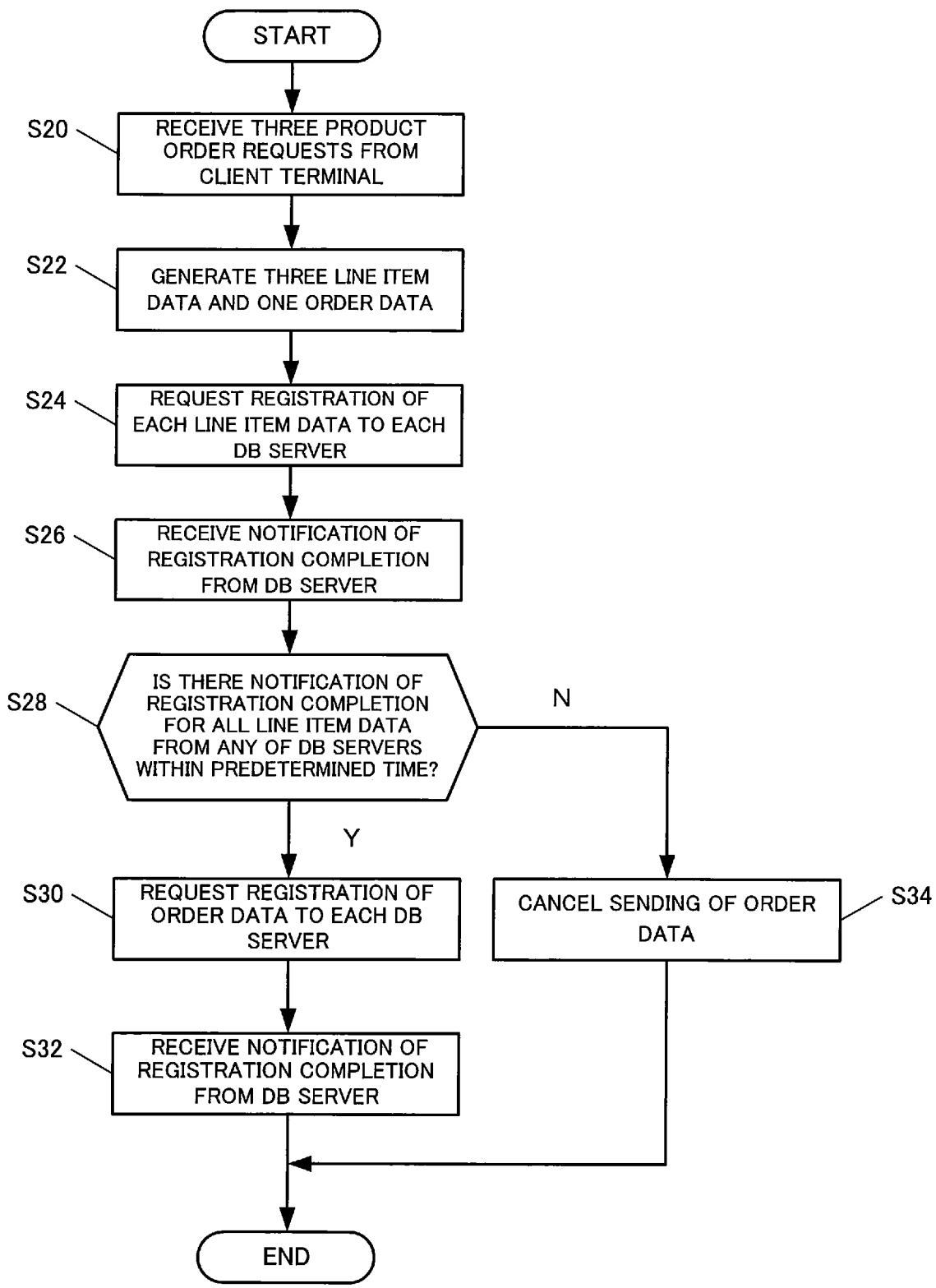
FIG. 6 is a flowchart showing a processing sequence in the case of applying the system to a product online shopping business.

Next, a description will be given of a registering sequence of data in the data management system 10 along a flowchart in FIG. 6.

First, it is assumed that the following product order requests are sent to the AP server 12 from the client terminal 28.

Figure 7:
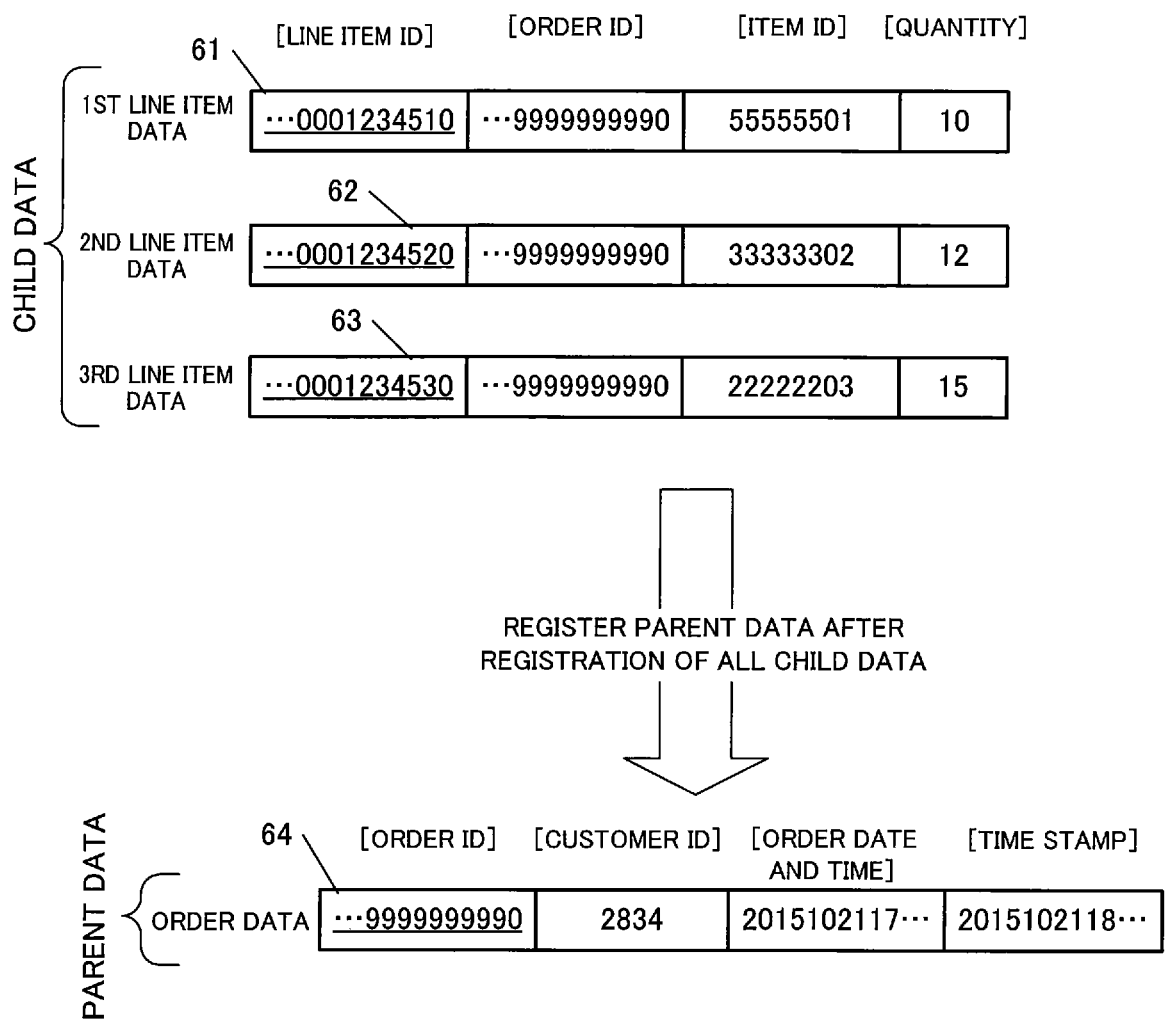
FIG. 7 is a diagram showing specific examples of line item data (child data) and order data (parent data).

(1) Cat sand (item ID: 55555501) 10 packages
(2) Diet cola (item ID: 33333302) 12 bottles
(3) Alcohol-free beer (item ID: 22222203) 15 bottles The business processing unit 30 having received the request (S20) receives the issuing of a necessary surrogate key from the surrogate key management unit 32 and thereafter generates three pieces of line item data (first line item data 61 to third line item data 63) and one piece of order data 64 (S22), as shown in FIG. 7.

The order data 64 functions as parent data, and includes data items of customer ID of a user, order date and time, and a time stamp in addition to unique order ID.

Further each line item data functions as child data, and includes data items of order ID of the parent data, item ID, and quantity in addition to unique line item ID.

Next, the business processing unit 30 first sends the three pieces of line item data to the data control unit 34, and requests registration to each DB server (S24).

Figure 8:
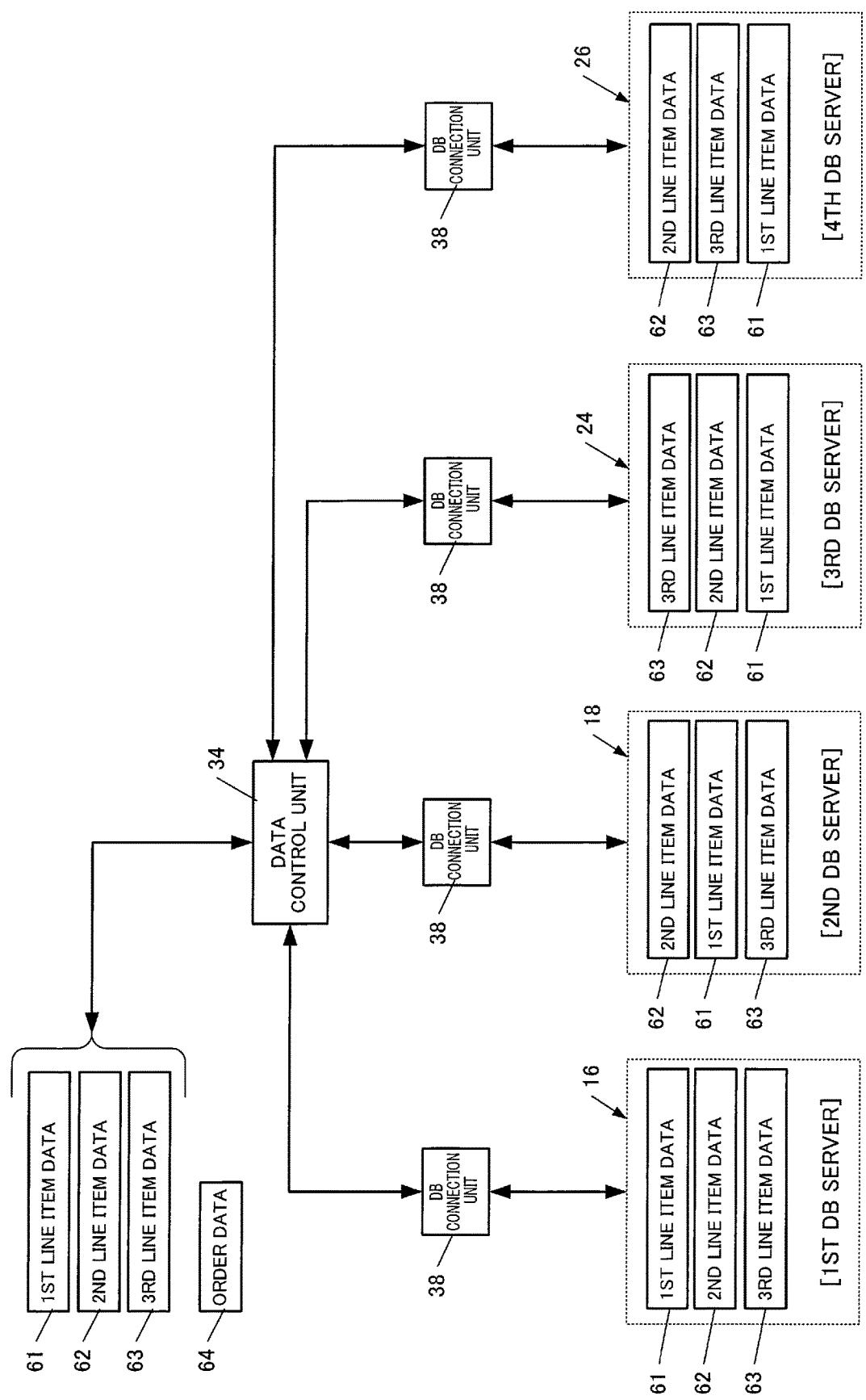
FIG. 8 is a schematic diagram showing a state of registering a plurality of pieces of line item data to a plurality of DB servers.

The data control unit 34 having received the request copies four pieces of each line item data, and allows them to be registered to the first DB server 16 to the fourth DB server 26, respectively, via each DB connection unit 38, as shown in FIG. 8.

In this case, the arrival order of each line item data is not a problem, and the order may be changed for every DB server.

When each DB server receives the data from the DB connection unit 38 and stores the data to a memory thereof, the DB server sends a notification of registration completion to the DB connection unit 38, and thereafter stores a corresponding record to a table provided in a hard disk or an external storage device such as SSD (the details will be described later).

The notification of registration completion sent from the DB server arrives at the business processing unit 30 via each DB connection unit 38 and the data control unit 34 (S26).

When the notification of registration completion is returned from any of the DB servers for all of the first line item data 61, second line item data 62, and third line item data 63 (Y/S28), the business processing unit 30 sends the order data 64 as the parent data to the data control unit 34, and requests to register the data to each DB server (S30).

The data control unit 34 having received the request copies four pieces of the order data, then sends them to the first DB server 16 to the fourth DB server 26, respectively, via each DB connection unit 38, and allows the data to be registered to each order table 40.

Each DB server, when having received the data from the DB connection unit 38 and stored it to a memory of the DB server, sends a notification of registration completion to the DB connection unit 38, and thereafter stores a corresponding record to a table provided in a hard disk or an external storage device such as SSD.

The notification of registration completion sent from the DB server arrives at the business processing unit 30 via each DB connection unit 38 and the data control unit 34 (S32).

Note that, when the notification of registration completion is not returned from any of the DB servers for specific line item data within a predetermined time due to some reason (N/S28), the business processing unit 30 admits time-out, and does not register the order data 64 (parent data) (S34).

In this case, the business processing unit 30, after generating the order data having another order ID and the first line item data to the third line item data having separate line item IDs, tries to register the first line item data to the third line item data again. Then, when the notification of registration completion arrives from any of the DB servers for each line item data, the business processing unit 30 allows new order data to be registered to each DB server.

The system 10 includes, as described above, a structure that, for all the line item data as the child data, the order data as the parent data is not registered as long as the registration in any of the DB servers is not completed.

Therefore, by adoption of a rule that 'when data is referred to, child data with corresponding parent data not registered therein is not included in the target', even if the registration of a part of the line item data fails, the remaining line item data registered successfully does not need to be explicitly invalidated.

Hereinbelow, a specific description will be given based on FIG. 9.

First, when the business processing unit 30 tries to register child data D, child data E, and child data F each having ID of parent data β, if the try times out without completing registration of the child data D due to some reason, the parent data β is not registered.

Instead, the business processing unit 30 generates parent data β' with substantially the same contents as those of the parent data β and changed ID, and generates child data D', child data E', and child data F' each including new ID and ID of the parent data β' with substantially the same contents as those of the previous child D, child data E, and child data F, and tries to register each child data to the DB server. Further, when the registration of the child data is completed, the business processing unit 30 allows the parent data β' to be registered.

As the result, the child data E and the child data F whose registration has been previously completed remain on the table of the DB server as they are.

However, the present system 10 is based on the rule 'the child data with corresponding parent data not registered therein is not included in the processing target' as described above. Accordingly, when the business processing unit 30 performs counting of the data or the like, the child data E and the child data F with corresponding parent data β not registered therein are handled as not included in the reference target.

Therefore, such inconvenience that inconsistent data is referred to is not caused, even if the child data E and the child data F are not explicitly invalidated by the roll-back processing.

However, if, as described above, the registration of the same child data is simultaneously requested to a plurality of DB servers operating in parallel and the notification of registration completion arrives from any one of the DB servers, as long as a structure for authorizing the registration of the child data is provided, occurrence of a case where the child data is not registered is relatively rare.

On the other hand, when the invention is applied to environment under which operation is performed with only one DB server, a case of failing the registration of the child data due to a machine trouble or a communication failure is assumed.

Moreover, as a result of dispensing with the roll-back processing by the DB server, a limitation that the same DB server conventionally has to be in charge of registration processing for a plurality of pieces of data included in one transaction is released.

Therefore, it becomes possible to achieve load distribution by allowing separate DB servers to process the registration of the parent data and the child data, respectively.

In transaction processing assuming conventional roll-back, since, at time of registration completion of all pieces of data, a message (commitment) of successful transaction is issued from the DB server, it has been necessary to wait until the AP server side receives the message.

On the other hand, in the case of the system 10, only the notification of registration completion of each data arrives from the DB server, and message of transaction completion is is not issued, and accordingly the amount of data communication in the whole system can be reduced and the standby time of the AP server can be reduced.

Incidentally, when the registration of the order data as the parent data is requested to each DB server in S30, such a case may be generated that the notification of registration completion is not returned from any of the DB servers within a given time.

However, in this case, since, with application of the rule, each previously-registered child data (line item data) is not included in the reference target, a problem of dirty read is not caused.

Accordingly, the business processing unit 30 can repeat the processing in S30 many times until completing the registration of the parent data.

In the above, the case is shown which applies the system 10 to the data processing of the transaction system such as online shopping, but the system 10 can be applied also to master-system data processing such as attribute management of an employee or a client.

FIG. 10 shows an example of tables stored in each DB server in this case. Each DB server commonly includes a user table 70, a user cancel table 71, a name table 72, a name cancel table 73, an address table 74, an address cancel table 75, a phone number table 76, a phone number cancel table 77, an Email table 78, and an Email cancel table 79.

Data items of user ID (primary key) and a time stamp are set to the user table 70.

Moreover, data items of user ID (primary key/external key) and a time stamp are set to the user cancel table 71.

Data items of name ID (primary key), user ID (external key), a name, and a time stamp are set to the name table 72.

Furthermore, data items of name ID (primary key/external key), and a time stamp are set to the name cancel table 73.

Data items of address ID (primary key), user ID (external key), an address, and a time stamp are set to the address table 74.

Moreover, data items of address ID (primary key/external key) and a time stamp are set to the address cancel table 75.

Data items of phone number ID (primary key), user ID (external key), a phone number, and a time stamp are set to the phone number table 76.

Furthermore, data items of phone number ID (primary key/external key) and a time stamp are set to the phone number cancel table 77.

Data items of Email ID (primary key), user ID (external key), a mail address, and a time stamp are set to the Email table 78.

In addition, data items of Email ID (primary key/external key) and a time stamp are set to the Email cancel table 79.

Next, a description will be described of a registering sequence of attribute data of a user along a flowchart in FIG. 11.

First, it is assumed that a new registering request of a user with the following attributes is sent to the AP server 12 from the client terminal 28.

(1) Name: Taro Yamada
(2) Address: Toranomon, Minato-ku, Tokyo . . . .
(3) Phone number: 03-3508 . . . .
(4) Mail address: t-yamada@ . . . .

The business processing unit 30 having received the above (S40) receives issuing of a necessary surrogate key from the surrogate key management unit 32, and generates four pieces of attribute data (name data 80, address data 81, phone number data 82, and Email data 83) and one piece of user data 84 (S42) as shown in FIG. 12.

The user data 84 functions as parent data, and includes data items of unique user ID and a time stamp.

Moreover, each attribute data functions as child data, and includes data items of not only unique ID (name ID, address ID, phone number ID, and Email ID) but also user ID of the parent data, attributes (name/address/phone number/mail address) thereof, and a time stamp.

The same time is described to the time stamp of each data in a unit of millisecond.

Next, the business processing unit 30 first sends the four pieces of the attribute data to the data control unit 34, and requests registration to each DB server (S44).

The data control unit 34 having received the request copies four pieces of the attribute data, and allows them to be registered to the first DB server 16 to the fourth DB server 26, respectively, via each DB connection unit 38.

In this case, the arrival order of each attribute data is not a problem, and the order may be changed for every DB server.

Each DB server, after receiving the data from the DB connection unit 38 and storing it to a memory of the DB server, sends a notification of registration completion to the DB connection unit 38, and thereafter stores a corresponding record to a table provided in a hard disk or an external storage device such as SSD.

The notification of registration completion sent from the DB server arrives at the business processing unit 30 via each DB connection unit 38 and the data control unit 34 (S46).

When the notification of registration completion is returned from any of the DB servers for all of the name data 80, address data 81, phone number data 82, and Email data 83 (Y/S48), the business processing unit 30 sends the user data 84 as the parent data to the data control unit 34, and requests registration to each DB server (S50).

The data control unit 34 having received the request copies four pieces of the user data 84, sends them to the first DB server 16 to the fourth DB server 26, respectively, via each DB connection unit 38, and allows the data to be registered to each user table 70.

Each DB server, after receiving the data from the DB connection unit 38 and storing it to a memory of the DB server, sends a notification of registration completion to the DB connection unit 38, and thereafter stores a corresponding record to a table provided in a hard disk or an external storage device such as SSD.

The notification of registration completion sent from the DB server arrives at the business processing unit 30 via each DB connection unit 38 and the data control unit 34 (S52).

Note that, when the notification of registration completion is not returned from any of the DB servers for specific attribute data within a predetermined time due to some reason (N/S48), the business processing unit 30 admits time-out, and does not register the user data 84 (S54).

In this case, the business processing unit 30, after generating user data having a new user ID and attribute data having another name ID and the new user ID, tries the registration to each DB server again. Then, when the notification of registration completion of each attribute data arrives from any of the DB servers, the business processing unit 30 allows the new user data to be registered to each DB server.

As mentioned above, there is provided a structure in which, as long as the registration of all the attribute data as the child data in any of the DB servers is not completed, the user data 84 as the parent data is not registered. Therefore, by adoption of a rule that 'when data is referred to, child data with corresponding parent data not registered therein is not included in the target', even if the registration of a part of the attribute data fails, the remaining attribute data registered successfully does not need to be explicitly invalidated.

When the name of the user is changed due to marriage or the like after completion of user registration, the business processing unit 30 generates updating name data having the name ID and a user ID and including a new name, and registers the data to each DB server.

In this case also, the business processing unit 30 identifies the latest name by comparing the time stamps of both the new and old name data.

Moreover, since old name data remains in the name table 72, it is also possible to handle a case where reference of the previous family name of the user is required later.

When the user is withdrawn, it is possible to invalidate all pieces of data related to the user by registering the user cancel data with the user ID in the user cancel table 71.

In this case also, since the data also remains as is in the user table 70 as is, the name table 72, the address table 74, and the like, it is possible to refer to the data of the withdrawing user later.

When the user is moved and an address and a phone number thereof are simultaneously changed, the address ID and the user ID and updated address data with a new address are generated. Further, the business processing unit 30 generates updated phone number data including the phone number ID and the user ID as well as a new phone number, and executes registration to each DB server.

In this case, there is not a problem if the registration of both the updated data is completed without fails. However, if the registration of any one of the updated data (e.g., updated address data) is completed and the registration of the other updated data (e.g., updated phone number data) fails, a problem can be caused.

That is, since there is user data as the parent data of both the updated data at this time point, the business processing unit 30 cannot invalidate the updated address data registered successfully.

As a result, until the registration of the updated phone number data is completed, when the attribute data of the user is displayed, such an illegal state (dirty read) is caused that the new address and the old phone number are described together.

In order to avoid such inconvenience as described above, as shown in FIG. 13(*a*), it is effective to provide an update management table 85 in advance in each DB server.

The update management table 85 includes data items of the user ID and the time stamp.

Here, when the address and the phone number of the user are simultaneously changed as mentioned above, as shown in FIG. 13(*b*), the business processing unit 30 generates update address data 86, update phone number data 87, and update management data 88.

The update address data 86 includes previous address ID and user ID, and an address and a time stamp after the change.

Further, the update phone number data 87 includes the previous phone number ID and user ID, and a phone number and a time stamp after the change.

The update management data 88 includes the user ID and the time stamp.

The same time is recorded to the respective time stamps of the update address data 86, the update phone number data 87, and the update management data 88.

Next, the business processing unit 30 sends the update address data 86 and the update phone number data 87 via the data control unit 34 and each DB connection unit 38 to each DB server, and requests the registration.

Each DB server having received the request stores the update address data 86 to the address table 74, and stores the update phone number data 87 to the phone number table 76.

Next, the business processing unit 30, after sending a notification of registration completion of the update address data 86 and the update phone number data 87 from any of the DB servers, sends the update management data 88 to each DB server via the data control unit 34 and each DB connection unit 38, and requests the registration.

On the other hand, when the notification of registration completion of at least one of the update address data 86 and the update phone number data 87, for example, the update address data 86 does not arrive from any of the DB servers due to some reason, the business processing unit 30 holds the sending of the update management data 88.

After the time-out, then the business processing unit 30 newly generates update address data, update phone number data, and update management data, and tries to register the update address data and the update phone number data again.

In this case, first update phone number data 87 registered successfully remains on the DB server side. However, when the business processing unit 30 handles each attribute data, it becomes possible to substantially invalidate the update phone number data 87 without explicitly invalidating it with the roll-back processing by applying the following rules.

(1) When a plurality of pieces of child data exists that shares ID of parent data and ID of child data, it is checked whether corresponding parent data is registered or not, and it is determined that the child data with registration is valid and the child data without registration is invalid.

(2) When a plurality of pieces of valid child data remains after application of the rule (1), the data is admitted as updated data except for the time stamp with the oldest child data (child data at time of new registration).

(3) For the updated data, it is checked whether the update management data with the same time stamp is registered or not, and it is determined that the updated data with registration is valid and the updated data without registration is invalid.

In the case of the system 10, the same data is stored in each DB server as mentioned above, and each AP server includes a function of executing the same business processing. Therefore, services can be simultaneously provided in parallel to a large number of client terminals 28, and the load distribution of the whole system 10 can be achieved.

Moreover, prior to the registration of the parent data, when the registration of a plurality of pieces of the child data is requested to each DB server, processing is shifted to the registration of the parent data when the notification of registration completion of each data arrives from at least one of DB servers, and it is not necessary to wait for the notification of registration completion from all the DB servers. Therefore, increase in the processing speed can be achieved.

Note that, when the notification of registration completion is not returned from any of the DB servers even after passage of a given time, the data control unit 34 admits that a communication failure or a machine trouble has occurred, and shifts the DB server to an off-line mode.

Specifically, the DB server is temporarily disconnected from the system 10, and is shifted to an operation mode based on only the remaining DB servers.

During this, the disconnected DB server is inspected and necessary recovery countermeasures are performed. For example, when it is determined that the notification of registration completion has not arrived due to failure of the communication device, after the device is exchanged with a new communication device, the DB server is set to a write mode (in a state in which only data writing is permitted and data reference is prohibited), and differential data is copied from another DB server installed in the same data center.

In the case of the system 10, as mentioned above, only the addition of each business data is permitted and a rule that the deletion and the updating are not permitted is applied. Therefore, the recovery of the data is extremely easy.

That is, in the case of premising that the deletion and the updating of the data are permitted, in order to recover the data, it is necessary to sequentially reproduce the addition, the deletion, and the updating of the data from a given time point based on updating history information that is held by the DB server. This takes a long time and large load. Further, it is necessary to provide the structure for reliably storing an updating log on the DB server side.

On the other hand, in the case of premising that only the addition of the data is permitted and the deletion and the updating are prohibited like the system 10, it is only necessary to compare the data registered to another normal DB server with the data registered to the DB server in which a trouble has occurred and to copy data that is simply insufficient.

Further, when the storage data recovers the latest state, the DB server is set to a read/write mode (state in which the writing and reference of data are permitted), and is reconnected to the system 10.

Thereafter, the data control unit 34 restarts the sending and reception of the data via the DB connection unit 38 in charge of the DB server.

Moreover, in the system 10, when the data sent from the DB connection unit 38 as mentioned above is stored to a memory of the DB server, the notification of registration completion is issued to the AP server from the DB server. Therefore, the business processing unit 30 can set the data to a reading target for an extremely short time.

With the conventional common sense, the memory is a volatile storage unit so that data is lost when power supply stops, and a completion notification is to be returned when the data is stored to a non-volatile storage unit (hard disk, etc.).

On the other hand, in the case of the system 10, even if data is damaged in one DB server, the system can recover the latest state only by simply copying insufficient data from an adjacent DB server. Therefore, the wait until the data is stored to the hard disk or the like is not necessary.

Since the business processing unit 30 marks the time stamp to the various business data (order data, line item data, attribute data, user data, and the like) with precision of millisecond, even in the case where a value of the surrogate key reaches MAX and the ID overlapped to the issued ID is re-issued (recycled), the business processing unit 30 can determine new or old data by comparing the time stamps.

Alternatively, the same type of table is finely classified with a unit of a predetermined term, and every time the term passes, the system is operated such that the storage destination of the data is changed to a new table that is physically separated, thus making it possible to effectively solve the overlapping problem of the surrogate key.

For example, such an operation corresponds to fine classification of the line item table 42 into 'line item table in August, 2016', 'order table in September, 2016', etc.

Note that, in the case where the value of the surrogate key reaches MAX within one month, the table may be operated to shift to a new table of the same type every week or every day.

In order to realize the invention, the presence of a plurality of AP servers and a plurality of DB servers is not necessarily a required condition. Any environment under which at least one AP server and one DB server are provided enables effective functioning.

Figure 15:
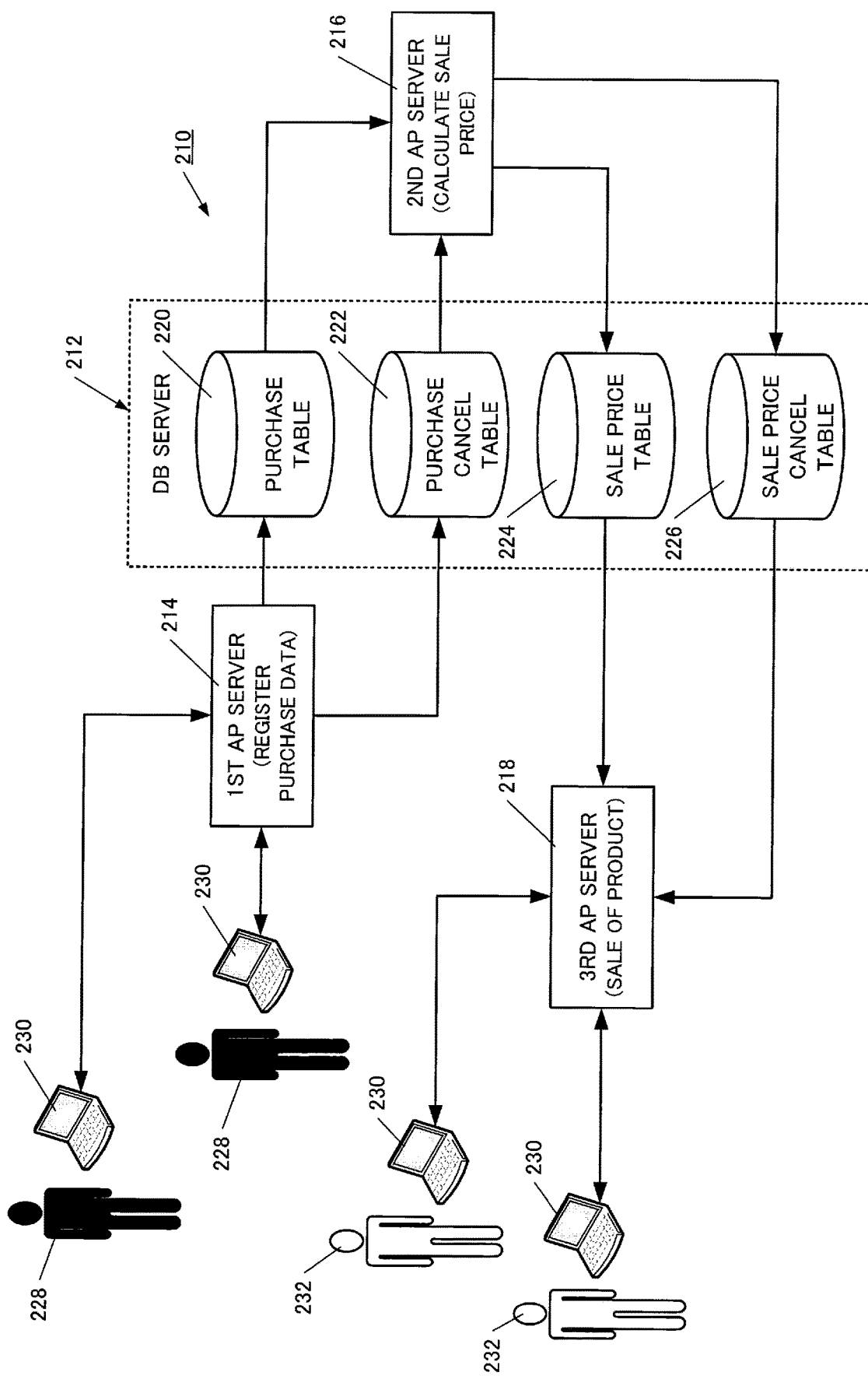
FIG. 15 is a diagram of the whole configuration of a first data management system.

FIG. 15 is a diagram of the whole configuration of a second data management system 210 according to the invention, including a DB server 212, a first AP server 214, a second AP server 216, and a third AP server 218.

The DB server 212, the first AP server 214, the second AP server 216, and the third AP server 218 are connected via a communication network, respectively.

For example, a purchase table 220, a purchase cancel table 222, a sale price table 224, and a sale price cancel table 226 are provided to an external storage device in the DB server 212.

As shown in FIG. 16(*a*), respective data items of purchase ID, supplier ID, product ID, quantity, price, and a time stamp are set to the purchase table 220.

Moreover, as shown in FIG. 16(*b*), respective data items of purchase ID and a time stamp are set to the purchase cancel table 222.

As shown in FIG. 16(*c*), respective data items of sale price ID, product ID, price, and a time stamp are set to the sale price table 224.

As shown in FIG. 16(*d*), respective data items of sale price ID and a time stamp are set to the sale price cancel table 226.

In the system 210, limitations of deleting (delete) prohibition and updating (update) prohibition are provided to the respective tables in advance.

That is, in the system 210, only addition (insert) and reference (select) to the respective tables are permitted.

Therefore, in the case where the existing data needs to be invalidated, it is possible to realize an equal state by adding a new record to another table, in place of deleting the record.

For example, for invalidation of specific purchase data stored in the purchase table 220 shown in FIG. 16(*a*), the purchase cancel data is added to the purchase cancel table 222 in FIG. 16(*b*).

Since purchase ID of the purchase data to be a cancel target is filled in a primary key of the purchase cancel data, in using the data, the AP server ignores the purchase data whose purchase ID is registered to the purchase cancel table 222 as not included in the target, among the respective purchase data registered to the purchase table 220.

Similarly, for invalidation of specific sale price data stored in the sale price table 224 shown in FIG. 16(c), the sale price cancel data is added to the sale price cancel table 226 in FIG. 16(d).

Since the sale price ID of the sale price data to be a cancel target is filled in a primary key of the sale price cancel data, in using the data, the AP server ignores the sale price data whose sale price ID is registered to the sale price cancel table 226 as not included in the target, among the sale price data registered to the sale price table 224.

In a case where the registered data needs to be corrected in the system 210, it is possible to handle the case by newly registering the record having data after the correction, in place of updating the existing record.

For example, in the case of correction of 'quantity' of certain purchase data, the AP server newly generates purchase data in which only quantity is changed with the same purchase ID, supplier ID, product ID, and price, sends the generated data to the DB server 212, and allows the data to be additionally registered to the purchase table 220.

Note that, even if the purchase data before the correction and the purchase data after the correction have the same purchase ID, since the time for generating each data is recorded to the time stamp with precision of millisecond, the AP server can specify the latest data at the reference time without fails.

The first AP server 214 has a function of receiving the purchase data and the purchase cancel data sent from a client terminal 230 that is operated by a staff assigned to purchase 228 who is assigned to each region, issuing an SQL statement corresponding to contents of each data to the DB server 212, and registering the SQL statement to the purchase table 220 and the purchase cancel table 222.

The second AP server 216 has a function of generating purchase price data for the next day with the batch processing based on the purchase data generated at the previous day.

Hereinbelow, a description will be given of processing contents of the second AP server 216 with a flowchart in FIG. 17.

First, the second AP server 216 reads the purchase data for the previous day from the purchase table 220 (S210). In the case where execution date of the batch processing is 22nd October, the purchase data generated on 21st October corresponds thereto.

As shown in FIG. 18(a), the time for generating the data is recorded to the time stamp of each purchase data in a unit of millisecond. Therefore, even under an environment for registering the purchase data sent from the first AP server 214 to the purchase table 220 as needed, the second AP server 216 refers to the time stamp, thereby clearly distinguishing target data (data generated on 21st October) of the batch processing and out-of-target data (data generated before 21st October or on 22nd October).

Next, the second AP server 216 refers to the purchase cancel table 222, and excludes the purchase data whose purchase ID is registered to the purchase cancel table as invalid purchase data among the purchase data for the previous day to be a target of the batch processing (S212).

Next, the second AP server 216 aggregates purchase price and quantity of each valid purchase data for each product, and calculates an average purchase price on the previous day of each product (S214).

Next, the second AP server 216 adds a predetermined profit to the average purchase price, thereby calculating a sale price of each product for the next day (on 23 October) (S216).

The second AP server 216 stores the sale price data of each product for the next day to the sale price table 224 within the current day (22 October) (S218).

Note that, when erroneous sale price data is registered due to some reason, the second AP server 216 sends the sale price cancel data including sale price ID of the sale price data to the DB server 212, and allows the data to be registered to the sale price cancel table 226.

The third AP server 218 has a function of referring to the sale price table 224 and the sale price cancel table 226 to derive the valid sale price of each product for the current day, and sending the price to the client terminal 230, when a request for presenting the product price is sent from the client terminal 230 operated by a general user 232, and has a function of receiving an order of the product.

Here, the valid sale price for the current day for the third AP server 218 means the sale price data whose corresponding sale price cancel data is not registered to the sale price cancel table 226 among the sale price data generated on the previous day (22 October) by the second AP server 216.

As shown in FIG. 18(b), the time for generating the data by the second AP server 216 is recorded to the time stamp of each sale price data in a unit of millisecond. Therefore, even if the past sale price data of each product is mixed in the sale price table 224, the third AP server 218 can accurately identify the sale price of each product to be presented on the current day.

As mentioned above, the time for generating the data is marked, as the time stamp, to the data generated by each AP server in the system 210. Further, the data is semi-permanently stored to the respective tables without deletion or updating of the once-generated data.

Therefore, for example, even in a case where such necessity is caused at the subsequent day to analyze the transition of the purchase price and the sale price of certain product, it is possible to flexibly handle the case by aggregating the past data stored in the respective tables.

In the above, the example is shown of the system 210 including one DB server 212. However, a plurality of DB servers operating in parallel can be also used.

FIG. 19 shows an example in which the system 210 includes the first DB server 212 and a second DB server 212' in addition to the first AP server 214, the second AP server 216, and the third AP server 218.

However, the number of DB servers is not limited to two, and, preferably, a more number of DB servers are installed.

Here, the first DB server 212 and the second DB server 212' each have a purchase table 220, a purchase cancel table 222, a sale price table 224, and a sale price cancel table 226. The same data is overlappingly stored to each table.

Therefore, when the first AP server 214 registers the purchase data or the like, a plurality of SQL statements with the same contents is generated, and the registration of the same data is simultaneously requested to the first DB server 212 and the second DB server 212'.

Similarly, when the second AP server 216 registers the sale price data or the like, a plurality of the SQL statements with the same contents is generated, and the registration of the same data is simultaneously requested to the first DB server 212 and the second DB server 212'.

On the other hand, in the case where the second AP server 216 or the third AP server 218 refers to the data, it is possible to request the extraction of the data to both the first DB server 212 and the second DB server 212'.

Note that, when the notification of registration completion is not returned after the passage of a given time from any of the DB servers, the AP server admits that a communication failure or a machine trouble has occurred, and shifts the DB server to an off-line mode.

Specifically, the DB server is temporarily disconnected from the system 10, and the system 10 shifts to an operation mode based on only the remaining DB servers.

During the term, the disconnected DB server is inspected and a necessary recovery countermeasure is performed. For example, when it is determined that the notification of registration completion has not arrived due to failure of a communication device, the DB server is set to a write mode (in a state of permitting only the writing of data and prohibiting the reference of the data) after replacement to a new communication device. Differential data is copied from another DB server.

In the case of the system 210, as mentioned above, since the rule that only the addition of each business data is permitted and the deletion and updating thereof are not admitted is applied to the system 210, the recovery of the data is extremely easy.

That is, in the case of premising that the deletion and the updating of the data are permitted, it is necessary to sequentially reproduce the addition, deletion and updating of the data from a given time point, based on the updating history information held by the DB server in order to recover the data, and this takes a long time and large load. Further, it is necessary to provide a structure for reliably storing the updating log on the DB server side.

On the other hand, in the case of premising that only the addition of the data is permitted and the deletion and the updating are prohibited like the system 210, it is only necessary to compare the data registered to another normal DB server with the data registered to the DB server in which failure has occurred, and to simply copy insufficient data.

Further, when the storage data recovers the latest state, the DB server is set to a read/write mode (state in which writing and reference of data are permitted) and is re-connected to the system 210.

Figure 20:
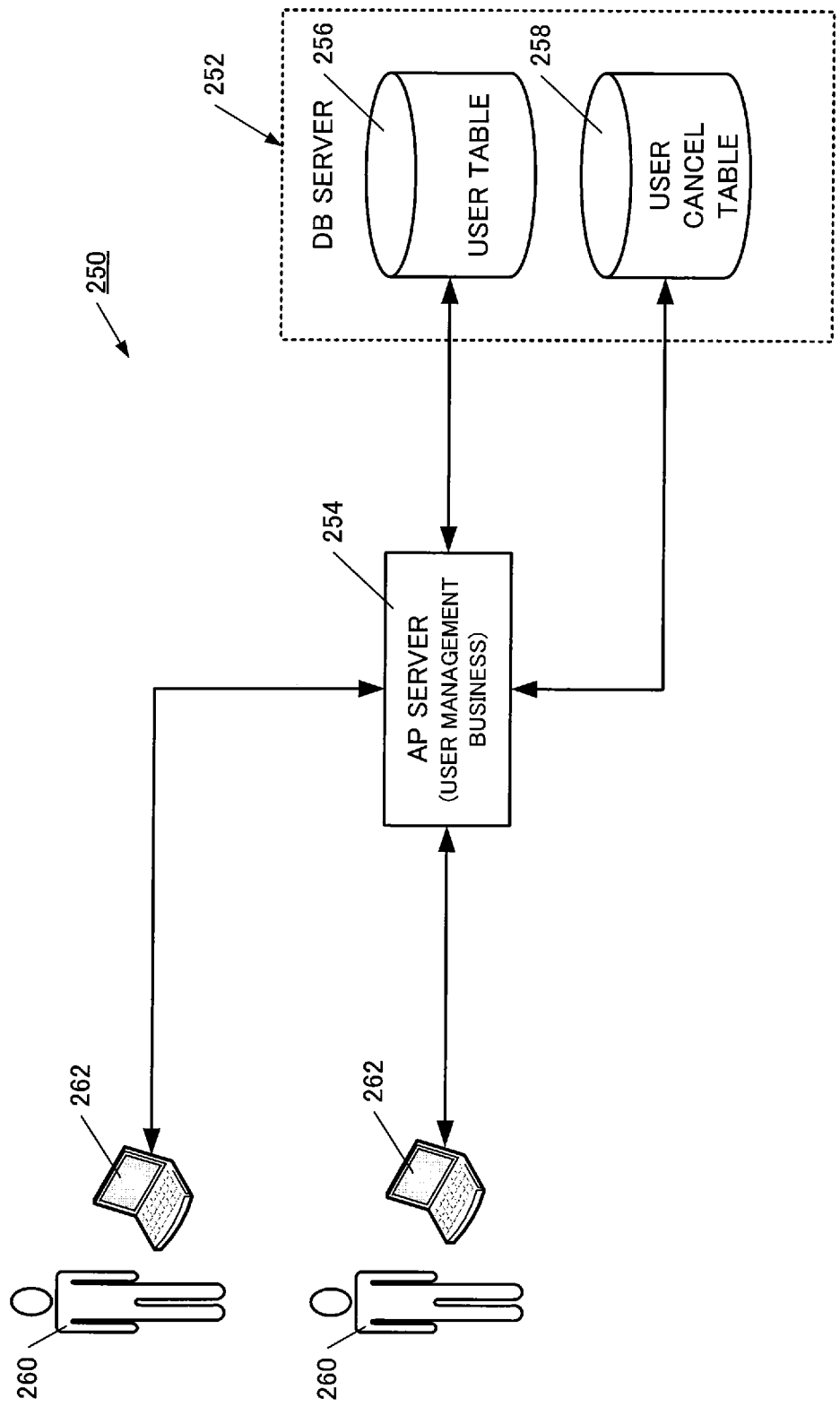
FIG. 20 is a diagram of the whole configuration of a second data management system.

FIG. 20 shows a third data management system. 250 obtained by applying the invention to management operation of user data, including a DB server 252 and an AP server 254.

The DB server 252 includes a user table 256 and a user cancel table 258. For the sake of convenience of the drawing, only one DB server 252 is drawn. However, similarly to the foregoing, a plurality of DB servers each including a mutually common table can also be used.

As shown in FIG. 21(*a*), data items of user ID, a name, an address, a phone number, a mail address, a time stamp, and the like, are set to the user table 256.

Moreover, as shown in FIG. 21(*b*), data items of user ID and a time stamp are set to the user cancel table 258.

When a request for registering a new user is sent from a client terminal 262 operated by a user 260, the AP server 254 generates user data with data items of user ID, a name, an address, a phone number, a mail address, a time stamp, and the like, and requests the DB server 252 to register the user data to the user table 256.

In this case also, limitations of deleting (delete) prohibition and updating (upload) prohibition are provided in advance to the user table 256.

Therefore, in a case where the registered data needs to be corrected, it is possible to handle the case by newly registering a record with data after the correction, in place of updating the existing record.

As shown in FIG. 22(*a*), for example, when a name of user data Y (name: Hanako Saito) at new registration time needs to be changed, the AP server 254 newly generates user data Y' which includes the same user ID, address, phone number, and mail address and in which only the name is changed to 'Hanako Unno', and sends the user data Y' to the DB server 252, and additionally registers the user data Y' to the user table 256.

In this case, even if the user data Y before the correction and the user data Y' after the correction have the same user ID (00012346), since the time for generating each data is recorded to the time stamp with precision of millisecond, the AP server 254 can specify the latest data at the reference time without fails.

Similarly, when the address and the phone number of user data X (Address: Koto-ku, Tokyo . . . /Phone number: 03-5606 . . . ) at new registering time need to be changed, the AP server 254 newly generates user data X' which includes the same user ID, name, and mail address and in which the address is changed to 'Mitaka-shi, Tokyo' and the phone number to '0422-45.2', sends the user data X' to the DB server 252, and additionally registers the user data X' to the user table 256.

Moreover, in a case where specific user data needs to be deleted due to withdrawal of the user, as shown in FIG. 22(*b*), it is possible for the AP server 254 to handle the case by sending user cancel data A to C having the user ID of user data to be a target each time to the DB server 252, and registering the data to the user cancel table 258.

As shown in FIG. 22(*b*), even after substantial (logical) updating or deletion of the user data, the original user data itself remains as is in the user table 256. Therefore, even when old family name or old address of the user needs to be referred to later or when it becomes necessary to access a withdrawn user, the AP server 254 can promptly execute the search and aggregating without recovering the data using another record.

For example, when it becomes necessary to search old family name of 'Hanako Unno', the AP server 254 extracts user data Y at old date that has been recorded to the time stamp among the user data matching the user ID of the user data Y', thereby promptly leading a fact that the old family name is 'Saito'.

Moreover, when it becomes necessary to notify the withdrawn user of new services, the AP server 254 can extract, from the user table 256, the user data relating to the user ID registered in the user cancel table 258, and can send a promotion mail to a mail address of each user data.

FIG. 23 shows the whole configuration of an account data management system. 310 according to the invention, including an AP server 312, a money reception management DB server 314, an account management DB server 316, and a payment management DB server 318.

A plurality of client terminals 322 such as PCs is connected to the AP server 312 via a Web server 320.

Moreover, a plurality of ATM terminals 326 is connected to the AP server 312 via an ATM server 324.

Although not shown in FIG. 23, the AP server 312 achieves load distribution with multiplexing via a load balancer.

The money reception management DB server 314 includes at least a money reception table 330, a money reception/remittance table 332, and a remittance reception table 334.

Records including data items of money reception ID, an account number, and an amount of money, etc. are stored to the money reception table 330.

Further, records including data items of money reception ID and remittance ID, etc. are stored to the money reception/remittance table 332.

Records including data items of remittance ID, etc. are stored to the remittance reception table 334.

The account management DB server 316 includes at least an account table 336.

Records including data items of an account number, a password, a type of deposit, a name of the account, etc. are stored to the account table 336.

The payment management DB server 318 includes at least a payment table 338, a payment/remittance table 340, a remittance table 342, and a remittance completion table 344.

Records including data items of payment ID, an account number, and an amount of money, etc. are stored to the payment table 338.

Further, records including data items of payment ID, remittance ID, etc. are stored to the payment/remittance table 340.

Records including data items of remittance ID, etc. are stored to the remittance table 342.

Records including data items of remittance ID, etc. are stored to the remittance completion table 344.

A plurality of DB servers 314' and 314" etc. each including the same tables (money reception table 330, money reception/remittance table 332, and remittance reception table 334) is provided as the money reception management DB server 314. The same data is simultaneously sent to each DB server 314 from the AP server 312, and additional registration to each table is overlappingly executed.

Moreover, also as the payment management DB server 318, a plurality of DB servers 318' and 318" etc. each including the same tables (payment table 338, payment/remittance table 340, remittance table 342, and remittance completion table 344) is prepared. The same data is simultaneously sent to each DB server 318 from the AP server 12, and additional registration to each table is overlappingly executed.

As mentioned above, a plurality of the money reception management DB servers 314 and a plurality of the payment management DB servers 318 each storing the same data are prepared. Therefore, at the reference time of the data, the AP server 312 can freely read the data from any of the DB servers, thereby achieving efficient data reference processing.

Moreover, it becomes possible to prepare for a large-scale disaster such as an earthquake by arranging a part of the DB servers each having the same contents at a remote location.

Further, only the addition and reference of the data are permitted to the money reception management DB server 314 and the payment management DB server 318, and a limitation for prohibiting the updating and deletion of the data is set in advance.

That is, once the updating and deletion of data are admitted as a general DB server, when failure has occurred in a part of the DB servers, it is necessary to sequentially reproduce the addition, deletion, and updating of the data from a given time point, based on the updating log held by the DB server in order to recover the data, and this takes a long time. In addition, it becomes necessary to provide a structure for reliably storing the updating log on the DB server side.

On the other hand, if only the 'addition' is permitted to the registration of the data, it is possible to recover the latest state only by comparing the data with the data registered to another DB server that is normally operating, and simply copying the difference. Therefore, the storage of the updating log is not necessary and the time to the recovery can be greatly reduced.

Moreover, since the recovery of the data is easy as described above, when the same data is overlappingly stored to a plurality of DB servers, it becomes unnecessary to follow a troublesome adjustment system between the DB servers called 'two-phase commit', and it is possible to simply request each DB server to additionally register the same data, and to read the data when a notification of completion is returned from each DB server (realization of so-called auto-commit).

A user of a bank operates the ATM terminal 326 or the client terminal 322, thereby depositing cash to an account of the user and withdrawing cash from the account of the user.

For example, when the user, after selecting 'deposit' from a service menu displayed on a display of the ATM terminal 326, inserts a cash card and inputs a password of the account, the account number and the password are sent to the AP server 312 via the ATM server 324.

The AP server 312 having received the account number and password refers to the account table 336 of the account management DB server 316 and checks validity of the account number and password.

Next, when the user inputs cash to the ATM terminal 326, the amount of money reception is sent to the AP server 312 from the ATM terminal 326.

The AP server 312 having received the amount of money reception sends money reception data (money reception ID, account number, and an amount of money, etc.) to the money reception management DB server 314.

The money reception management DB server 314 additionally registers the money reception data to a money reception table 330.

Moreover, when the user selects "withdrawal" from the service menu and designates the amount of money, the amount of withdrawn money is sent to the AP server 312 via the ATM server 324.

The AP server 312 having received the amount of money firstly calculates the balance of the account (a method for calculating the balance will be described later.)

Then, when the balance is over the withdrawn amount of money, instruction data of cash payment is sent to the ATM terminal 326 and corresponding payment data (payment ID, account number, amount of money, etc.) is generated, and the data is sent to the payment management DB server 318.

The payment management DB server 318 additionally registers the payment data to the payment table 338.

The user can access the AP server 312 via the Web server 320 from the client terminal 322 placed at home or office, and also deposit or withdraw (charge) money using an electronic money card.

Next, a description will be given of a remittance method between accounts using the system. 310 along a flowchart in FIG. 24.

First, when the user, after selecting 'transfer' from the service menu displayed on the display of the ATM terminal 326, designates the amount of money and the account number of the transfer destination, remittance request data is sent to the AP server 312 via the ATM server 324. The remittance request data includes the account number of the user, the account number of the transfer destination, and the amount of money.

The AP server 312 having received this (S310) generates unique remittance ID and payment ID, further generates remittance data (remittance ID, etc.), payment data (payment ID, account number of the user, the amount of money, etc.), and payment/remittance data (payment ID, remittance ID, etc.), sends these data to the payment management DB server 318, and requests the registration of these data to the remittance table 342, the payment table 338, and the payment/remittance table 340, respectively (S312).

The payment management DB server 318 having received the request adds collectively, as one transaction, remittance data, payment data, and payment/remittance data to the remittance table 342, the payment table 338, and the payment/remittance table 340, respectively.

The AP server 312 having received the notification of registration completion to each table from the payment management DB server 318 (S314) sends a notification of remittance completion to the ATM terminal 326 via the ATM server 324 (S316).

Next, the AP server 312, after generating unique money reception ID, generates remittance reception data (remittance ID, etc.), money reception data (money reception ID, an account number of the transfer destination, and an amount of money, etc.), and money reception/remittance data (money reception ID, remittance ID, etc.), sends the data to the money reception management DB server 314, and requests the registration of the data to a remittance reception table 334, a money reception table 330, and a money reception/remittance table 332 (S318).

The money reception management DB server 314 having received the request adds collectively remittance reception data, money reception data, and money reception/remittance data as one transaction to the remittance reception table 334, the money reception table 330, and the money reception/remittance table 332, respectively.

The AP server 312 having received the notification of registration completion from the money reception management DB server 314 (S320) sends the remittance completing data (remittance ID, etc.) to the payment management DB server 318, and requests the registration to the remittance completing table (S322).

When the remittance ID is registered to the remittance completing table, a series of remittance processing are completed without fails. Therefore, the AP server 312 periodically checks the remittance table 342 and the remittance completion table 344. When there is remittance processing in which the remittance ID is not registered to the remittance table 342, processing for resending the money reception data, the money reception/remittance data, and the remittance reception data to the money reception management DB server 314 is executed on background.

When a first request has not arrived due to some reason, the money reception management DB server 314, after completing the collective addition of each data again based on the resent request for registration, sends the notification of registration completion to the AP server 312.

The AP server 312 having received the notification of registration completion from the money reception management DB server 314 sends the remittance completing data to the payment management DB server 318, and requests the registration to the remittance completing table.

On the other hand, when the additional registration of each data are completed based on the first request but the notification of registration completion does not arrive at the AP server 312 due to a communication failure or the like, the money reception management DB server 314 resends the notification of registration completion without overlappingly registering the data, based on the request for the registration after the second time.

This is realized based on the original function of the DB server for automatically excluding the overlapping registration of the data having the same ID.

That is, as the 'money reception ID' as a primary key of the money reception data and the money reception/remittance data, new ID is issued for every resending of the money reception data. However, the first 'remittance ID' is filled in a primary key of the remittance reception data. Therefore, the DB server can avoid the overlapping registration of the data by checking the remittance ID.

Next, a description will be given of the sequence of checking the balance of the account using the system 310 along a flowchart in FIG. 25.

First, when the user selects the 'check of balance' from the service menu displayed on the display of the ATM terminal 326, a request for checking the balance with the account number is sent to the AP server 312 via the ATM server 324.

The AP server 312 having received the request (S330) sends the account number to the payment management DB server 318, and requests extraction of the payment data related to the account number (S332).

Then, when the corresponding payment data is sent from the payment management DB server 318, the AP server 312 adds the amount of money of each payment data, and obtains the total amount of money (S334).

Next, the AP server 312 sends the account number to the money reception management DB server 314, and requests the extraction of the money reception data related to the account number (S336).

Then, when the corresponding money reception data is sent from the money reception management DB server 314, the AP server 312 adds the amount of money of each money reception data and obtains the total amount of money (S338).

Next, the AP server 312 subtracts the total amount of money of the payment data from the total amount of money of the money reception data, thereby deriving the balance at the current time (S340).

The balance data is sent to the ATM terminal 326 via the ATM server 324 (S342), and is displayed on the display.

The case where the user selects the check of balance on the ATM terminal 326 is described above. However, even in the case of checking the balance of the account as preprocessing of withdrawal or transfer, the AP server 312 calculates the balance of the account with the similar processing sequence.

As mentioned above, it becomes possible to separate the payment processing from the remittance source account on the and money reception processing to the account on the remittance destination in the case of performing processing such as the remittance over accounts by employing a method for calculating with arithmetic operation as needed, without providing a table dedicated for managing the balance of the account on the DB server side.

That is, in the case of managing the balance by providing a conventional balance table, it is necessary to simultaneously perform the payment from the remittance source account and the money reception to the remittance destination account in the remittance processing, and to reflect the result on the balances thereof, and adjustment (two-phase commit) of timing between a plurality of DB servers is inevitable.

Moreover, when any one of the processing fails by any chance, processing (roll-back) for recovering the state of each table is required.

Obviously, once the balance is calculated by calculation each time it becomes necessary to check the balance, the load increase on the AP server 312 side is inevitable. However, it is possible to sufficiently handle such a case, as mentioned above, by multiplexing the AP server 312 via a load balancer or constructing the AP server 312 by a multi-cored server computer. In the case where data is generated over a range capable of enhancing hardware, the total value until the previous day is held as a snap shot on the AP server. An operation for updating the snap shot every day is caused. Advantageously, the calculation load for repetitively calculating unchanged past specific lines is reduced. With the addition of the data generated on the current day and the snap shot until the previous day, it is possible to keep a response speed for checking the balance that does not depend on the number of histories of the specification lines.

Incidentally, in the system for globally performing distribution processing by using a large number of AP servers and DB servers, with a method by which the consistency of information is assured at writing time of data and the consistency at reading time depends on the consistency at writing time, an error is caused at the time of the time stamp by the time difference based on the difference of a time zone where each server is installed, wrong time of a clock for every server, a difference of a communication environment, or the like. Therefore, as shown in the following reference document 1, it has been necessary so far to provide a large-scale and strict structure for clock synchronization using an atomic clock or a GPS.

[Reference document 1]
Google 'Spanner': global-scale real-time database
Internet URL:
http://wired.jp/2012/11/28/google-spanner-time/Search date: 28 Oct. 2016

On the other hand, in the case of the account data management system. 310, only when the AP server 312 receives the notification of registration completion of remittance relating data (remittance data, payment data, and payment/remittance data) from the payment management DB server 318, corresponding money reception relating data (remittance reception data, money reception data, and money reception/remittance data) is sent from the AP server 312 to the money reception management DB server 314. Further, there is a structure that money reception relating data is repetitively sent to the money reception management DB server 314 from the AP server 312 until the notification of registration completion arrives from the money reception management DB server 314 and remittance completing data is registered to the remittance completion table 344 of the payment management DB server 318.

That is, a structure is provided in which the sequence of the registration of the remittance relating data and of the registration of the money reception relating data is assured by the AP server 312.

Therefore, even when the money reception table 330 or the payment table 338 mixedly includes data sent from the AP server 312 under various conditions belonging to various time zones, the AP server 312 does not need to refer to the time stamp of each data at the balance aggregating time of the account, and subtracts the total amount of money of the existing payment data from the total amount of money of the existing money reception data, thereby simply deriving the amount of balance at the current time.

That is, in viewpoint of consistency of the information, a system configuration that does not depend on the consistency at the writing time is formed and the consistency at the reading time is independent of the consistency at the writing time. Consequently, in the account data management system 310, it is meant that a large-scale structure for globally synchronizing a clock of each server is not necessary.

Moreover, in the case of the system 310, as mentioned above, since it has a structure such that the limitation for prohibiting the deletion and updating of the record is provided to the tables stored in the money reception management DB server 314 and the payment management DB server 318 and only the addition and the reference of the record is simply permitted, advantageously, processing on the DB server side is made efficient.

With the system 310, in the remittance processing, it is inevitable to generate a slight time-lag between the registering processing of the data on the payment side and the registering processing of the data on the money reception side, in the remittance processing. However, in consideration of actual transaction situations, the level of the time-lag does not matter.

Further, there is a structure for resending the money reception data, money reception/remittance data, and the remittance reception data to the money reception management DB server 314 from the AP server 312 until the remittance ID is registered to the remittance completion table 344. Therefore, as long as at least one of the plurality of money reception management DB servers 314 and at least one of the plurality of payment management DB servers 318 are operated, it has an advantage that the consistency of the data is consequently assured.

Furthermore, as a result of dividing the data managing function into two of the money reception management DB server 314 and the payment management DB server 318, it is possible to achieve the efficient distribution processing.

Further, the money reception management DB server 314 and the payment management DB server 318 are multiplexed by a plurality of DB servers each having the same table and the same data, and thereby the AP server 312 can simultaneously extract the data in parallel from a plurality of DB servers, thus achieving the further efficient processing.

The multiplexing needs readjustment of the configuration of the time synchronizing system when the system configuration assuming the time synchronization between the servers is employed. However, with the present system, it is not premised that the time synchronization is performed between the servers, the multiplexing can be easily performed accordingly.

In the above description, the example is shown of applying the system 310 to the data management of the account of the bank deposit. However, the invention is not limited to this.

For example, the system 310 may be applied to the data management of the account for managing the point of the user.

In this case, the 'money reception', 'payment', 'remittance', 'balance', 'amount of money', and 'account number' may be read as 'addition of point', 'use (application) of point', 'transfer of point', 'balance of points', 'number of points', and 'account', respectively.

EXPLANATION OF REFERENCES

10: data management system
12: first data center
14: first AP server

16: first DB server
18: second DB server
20: second data center
22: second AP server
24: third DB server
26: fourth DB server
27: communication network
28: client terminal
29: communication line
30: business processing unit
32: surrogate key management unit
34: data control unit
38: DB connection unit
40: order table
41: order cancel table
42: line item table
43: line item cancel table
46: surrogate key management table
47: last-digit management table of surrogate key
48: AP server management table
49: data center management table
61: first line item data
62: second line item data
63: third line item data
64: order data
70: user table
71: user cancel table
72: name table
73: name cancel table
74: address table
75: address cancel table
76: phone number table
77: phone number cancel table
78: Email table
79: Email cancel table
80: name data
81: address data
82: phone number data
83: Email data
84: user data
85: update management table
86: update address data
87: update phone number data
88: update management data
210: first data management system
212: DB server (first DB server)
212': second DB server
214: first AP server
216: second AP server
218: third AP server
220: purchase table
222: purchase cancel table
224: sale price table
226: sale price cancel table
228: staff assigned to purchase
230: client terminal
232: general user
250: second data management system
252: DB server
254: AP server
256: user table
258: user cancel table
260: user
262: client terminal
310: account data management system
312: AP server
314: money reception management DB server
316: account management DB server
318: payment management DB server
320: Web server
322: client terminal
324: ATM server
326: ATM terminal
330: money reception table
332: money reception/remittance table
334: remittance reception table
336: account table
338: payment table
340: payment/remittance table
342: remittance table
344: remittance completion table

The invention claimed is:

1. A data management system comprising:
an application server; and
a first database server,
wherein the application server
  sends business data generated as a result of business processing to the first database server,
  requests registration to a corresponding table, the business data including a combination of first parent data and a plurality of first pieces of child data which have mutual relevance, each of the first pieces of child data including a first parent identifier of the first parent data as an external key in addition to first child identifiers unique to the pieces of child data, respectively
  upon registration of the business data, the application server
    first, requests registration of each of the first pieces of child data to the first database server,
    upon expiration of a predetermined time period without receiving a notification of registration completion of all of the first pieces of the child data, generates second pieces of the child data with second child identifiers and a second parent identifier, different than the first parent identifier, for second parent data, based on copies of the first parent data and first pieces of the child data and requests registration of each of the second pieces of the child data by the first database server, and
    second, requests registration of the first parent data to the first database server when the notification of registration completion of all of the first pieces of the child data arrives from the first database server, or cancels the registration of the first parent data when the notification of registration completion of the second pieces of the child data arrives and requests registration of the second parent data to the first database server, and
  upon reference to registered business data, the application server sets only the second pieces of the child data with the second parent data registered therein as a reference target, and does not set the first pieces of the child data with the first parent data when the first parent data is not registered therein as the reference target.

2. The data management system according to claim 1,
wherein the first database server is one of a plurality of database servers, and
wherein upon registration of either of the first and second parent data, the application server requests registration to a second database server separate from the first database server that has requested the registration of the child data.

3. The data management system according to claim 1,
wherein the first database server is one of a plurality of database servers, each including a common table that stores identical data,
wherein upon registration of the business data, the application server
first requests registration of each piece of the child data to each of the database servers, and
second requests registration of corresponding parent data to each of the database servers when a notification of registration completion of all pieces of the child data arrives from any of the database servers, or cancels the registration of the corresponding parent data when the notification of registration completion of any of the child data does not arrive from any of the database servers within a predetermined time.

4. The data management system according to claim 3, wherein a limitation is set to permit only reference and addition of a record and prohibit deletion and updating, to a table of the database server.

5. The data management system according to claim 4, wherein when existing business data needs to be deleted, the application server
generates a data item with an existing identifier of the existing business data as a cancel target, and
registers the data item in a cancel table of canceled business data in each database server.

6. The data management system according to claim 5,
wherein a time stamp at business processing time is marked in each piece of the business data, and
wherein the application server, when the existing business data needs to be updated,
generates new business data having an existing identifier of the existing business data and including a value after correction and a time stamp at correction time, and
registers the new business data in the corresponding table provided in each of the database servers.

7. The data management system according to claim 4,
wherein a time stamp at business processing time is marked in each of the business data, and
wherein the application server, when existing business data needs to be updated,
generates new business data having the existing identifier of the existing business data and including a value after correction and a correction time stamp of a correction time, and
additionally registers the new business data in the corresponding table provided in each of the database servers.

8. The data management system according to claim 7, wherein the application server, when necessary to simultaneously update a plurality of pieces of existing child data with mutual relevance,
generates new pieces of the child data including
new child identifiers unique for each new piece of the child data,
a common identifier of common parent data that is mutually common among the new pieces of the child data,
a value after each correction, and
a common time stamp of the correction time that is mutually common among the new pieces of the child data;
generates updating management data including the common identifier of the common parent data and the common time stamp,
first, requests registration of each of the new pieces of the child data for updating to each of the database servers,
second, requests registration of the updating management data to each of the database servers when the notification of registration completion of all of the new pieces of the child data arrives from any of the database servers, or cancels the registration of the updating management data when the notification of registration completion of any of the new pieces of the child data does not arrive from all of the database servers within a predetermined time, and
upon reference to the new pieces of the child data, sets only the new pieces of the child data having registration in the updating management data of the common identifier of the common parent data relating to each of the new pieces of the child data and the common time stamp as the reference target, and does not set any of the new pieces of the child data not having the common identifier registered in the updating management data as the reference target.

* * * * *